Figure 13:
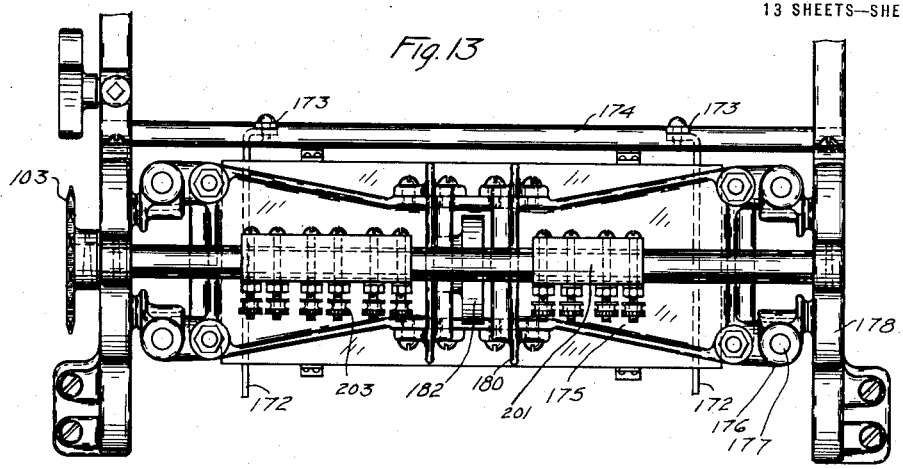

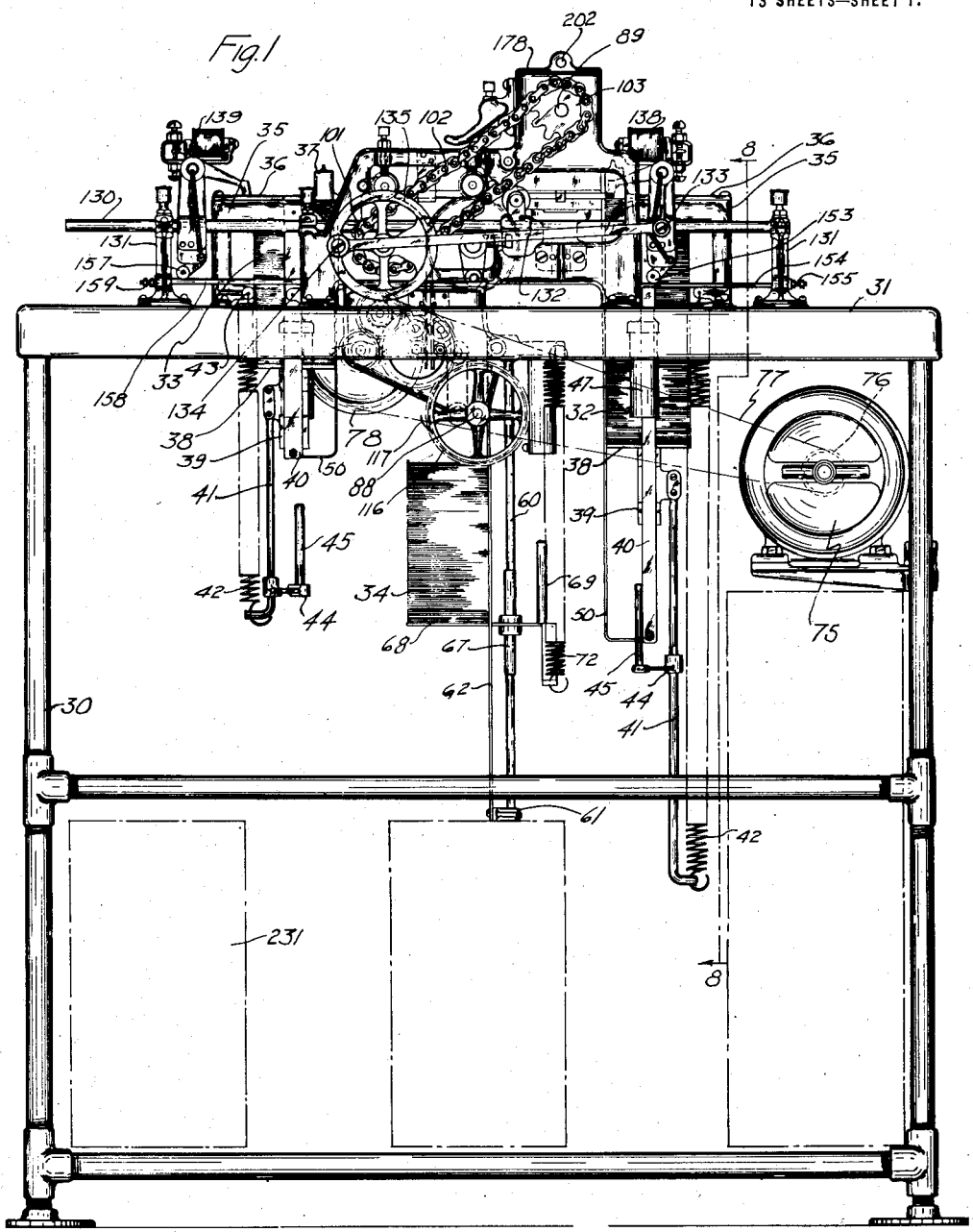

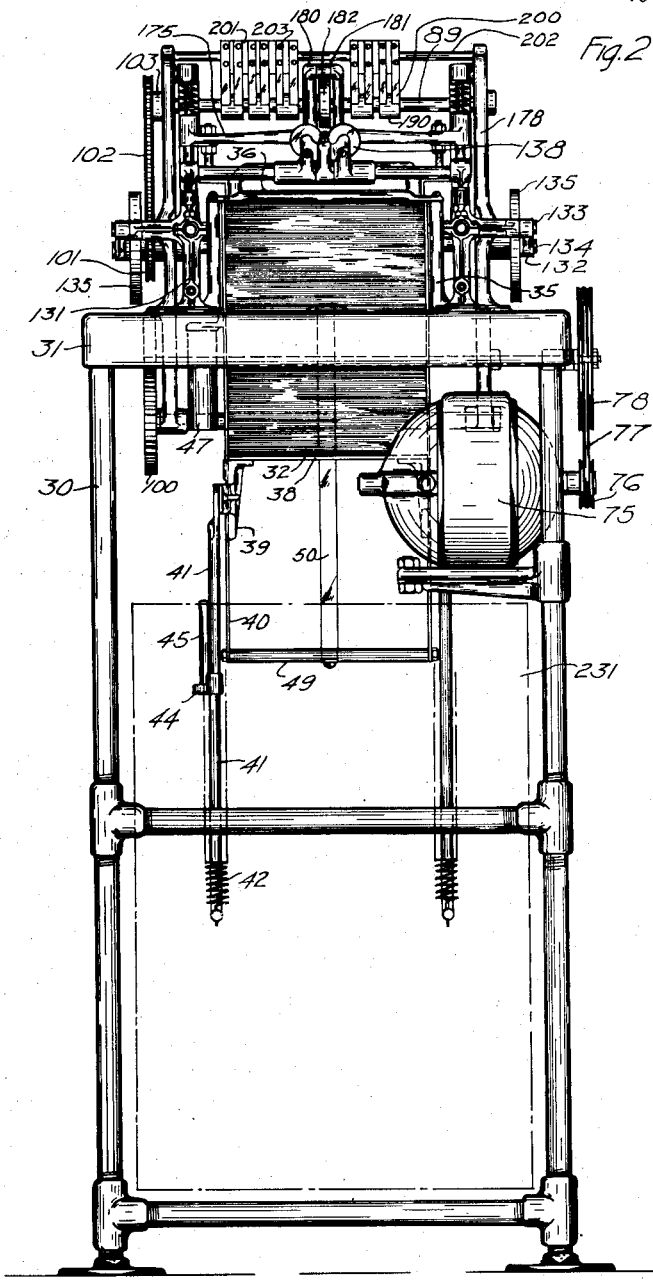

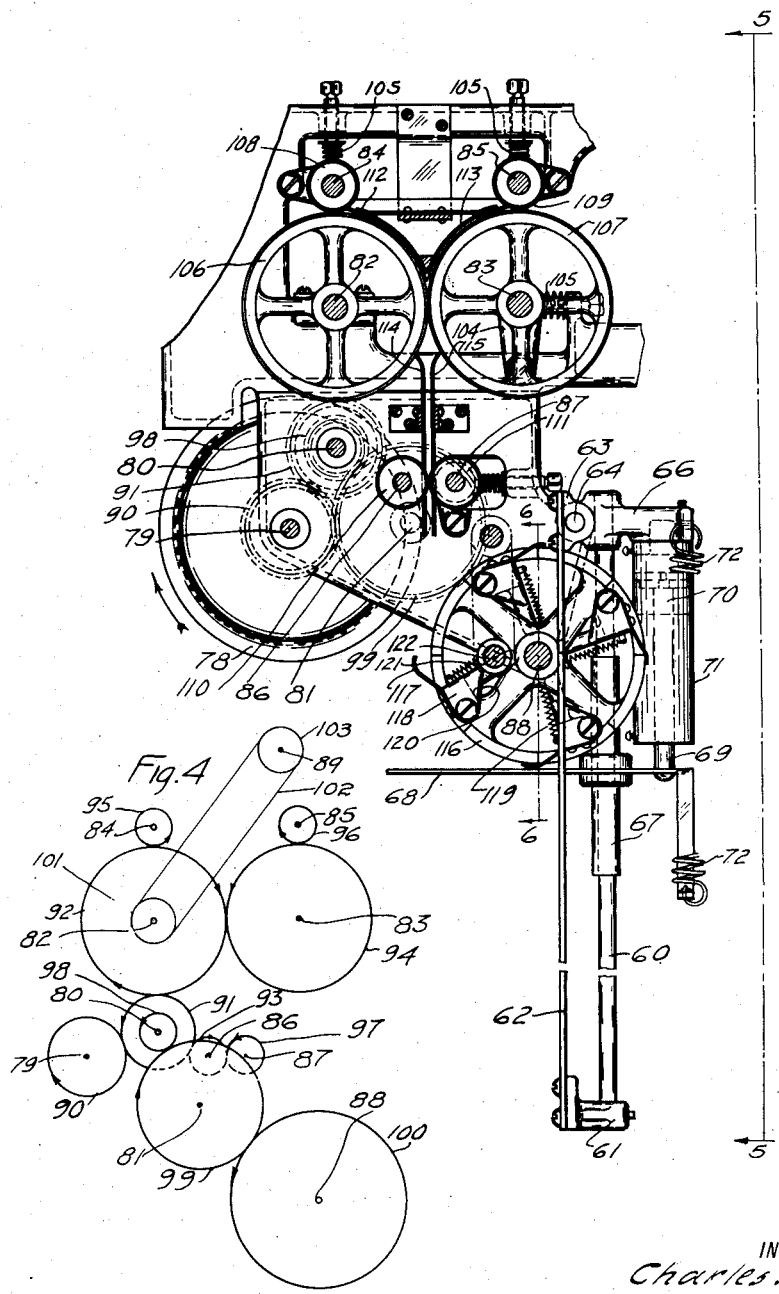

C. A. TRIPP.
STOP CARD INSERTING MACHINE.
APPLICATION FILED JUNE 26, 1915.
1,208,051.
Patented Dec. 12, 1916.
13 SHEETS—SHEET 4.
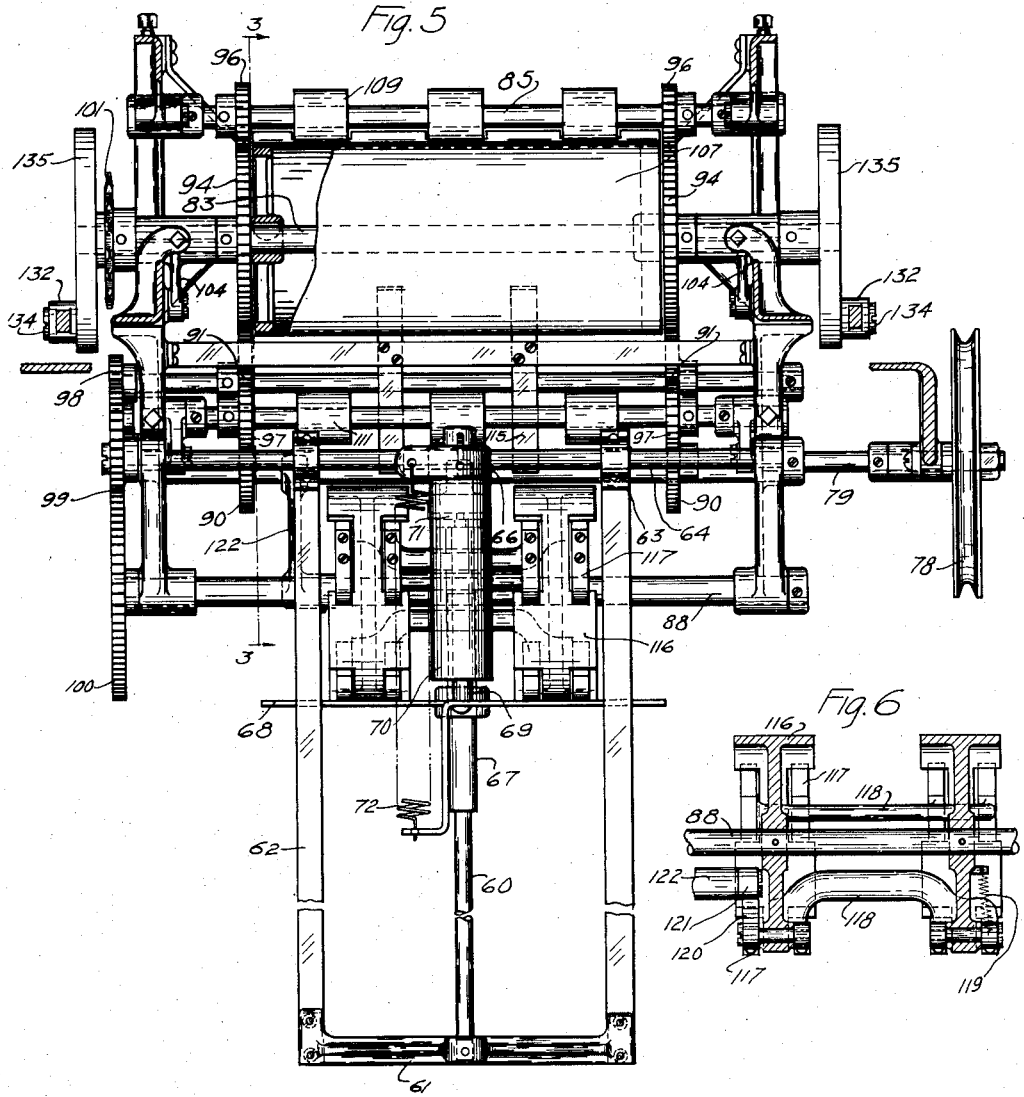
INVENTOR
Charles A. Tripp,
BY
Hood & Ashley
ATTORNEYS C. A. TRIPP.
STOP CARD INSERTING MACHINE.
APPLICATION FILED JUNE 26, 1915.
1,208,051.
Patented Dec. 12, 1916.
13 SHEETS—SHEET 5.
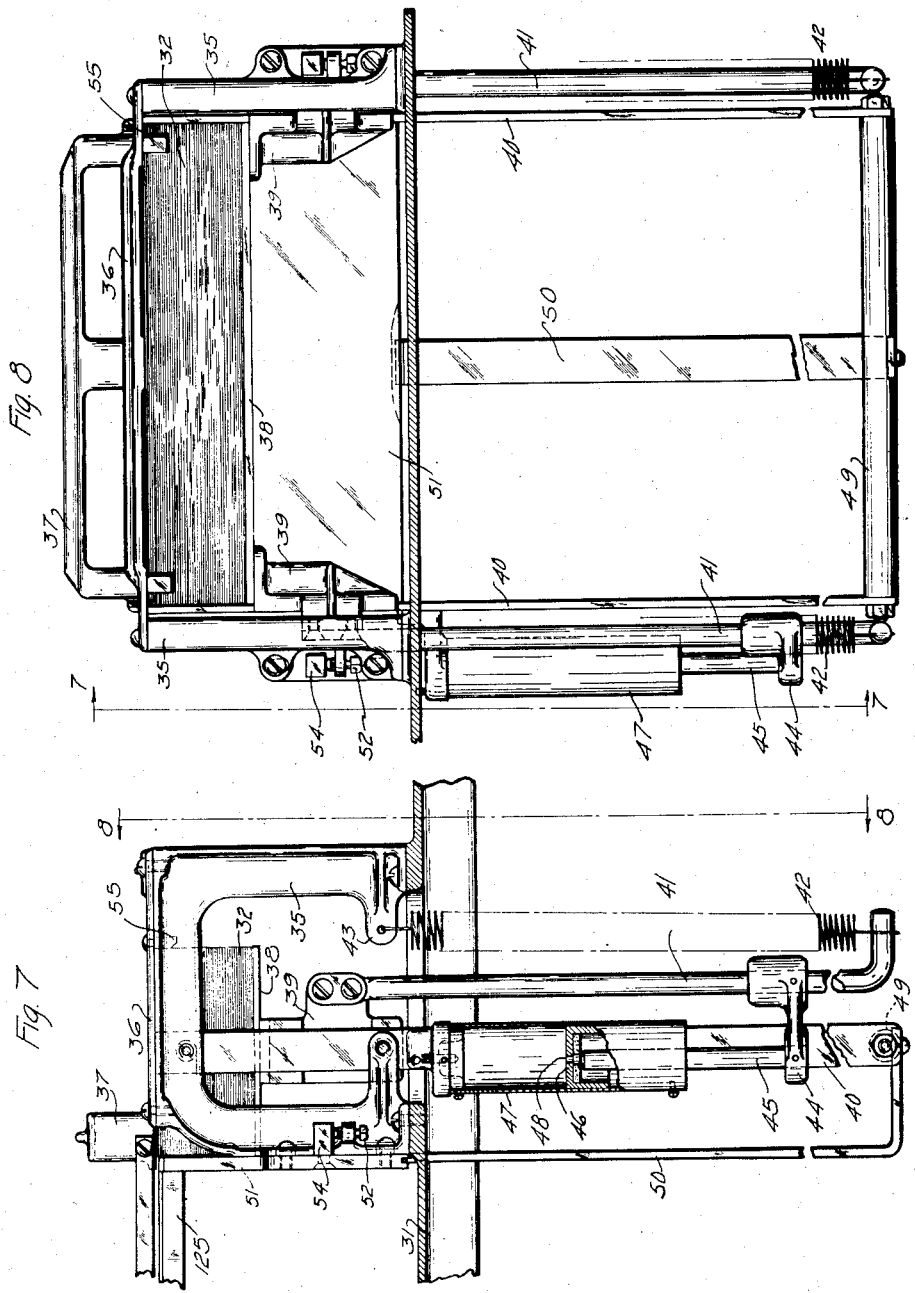
INVENTOR
Charles A. Tripp,
BY
Hood &Schley.
ATTORNEYS

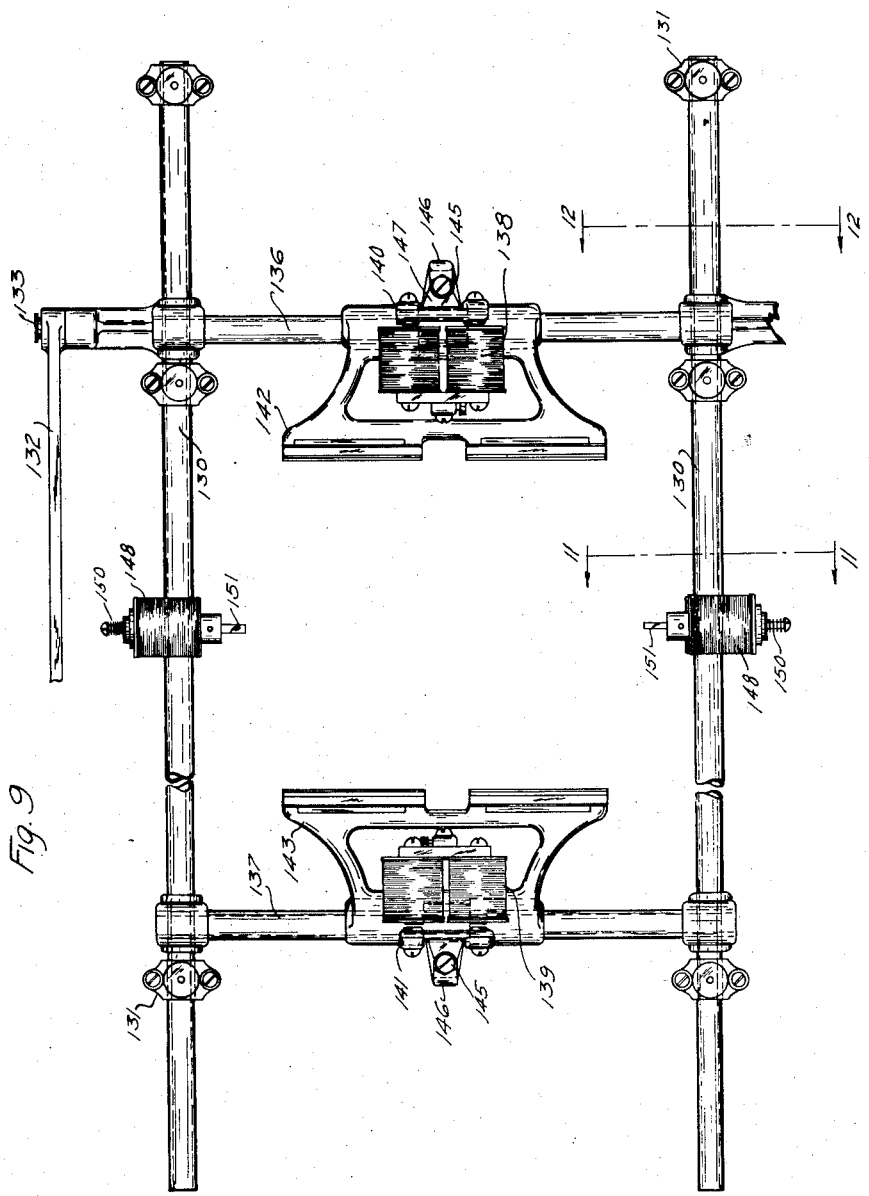

C. A. TRIPP.
STOP CARD INSERTING MACHINE.
APPLICATION FILED JUNE 26, 1915.
1,208,051. Patented Dec. 12, 1916.
13 SHEETS—SHEET 7.
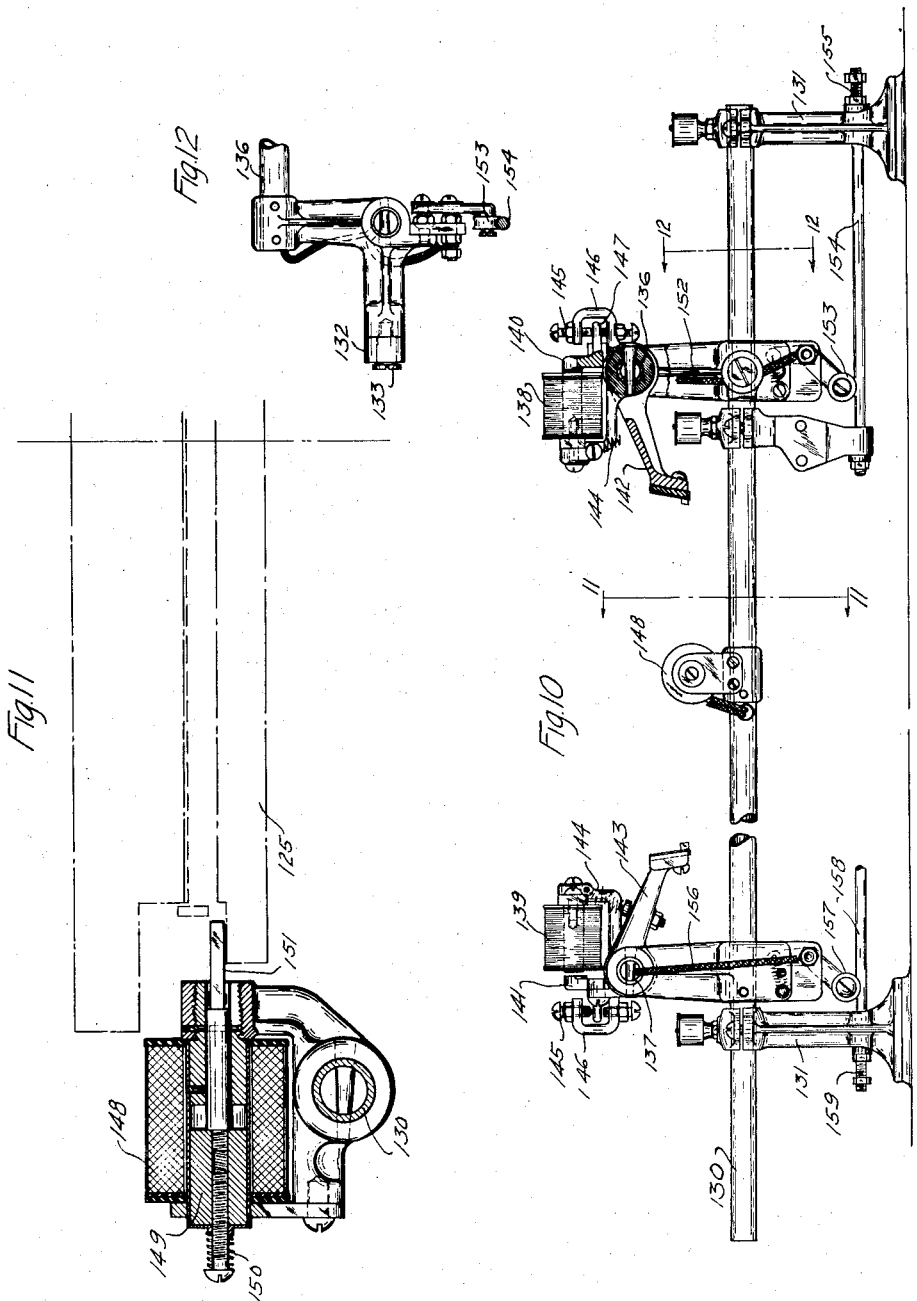
INVENTOR
Charles A. Tripp,
BY
Hood & Ashley
ATTORNEYS

C. A. TRIPP.
STOP CARD INSERTING MACHINE.
APPLICATION FILED JUNE 26, 1915.

1,208,051.

Patented Dec. 12, 1916.
13 SHEETS—SHEET 8.

INVENTOR
Charles A. Tripp,
BY
Hood & Schley
ATTORNEYS

C. A. TRIPP.
STOP CARD INSERTING MACHINE.
APPLICATION FILED JUNE 26, 1915.

1,208,051.

Patented Dec. 12, 1916.
13 SHEETS—SHEET 9.

INVENTOR
Charles A. Tripp,
BY
Hood &Schley
ATTORNEYS

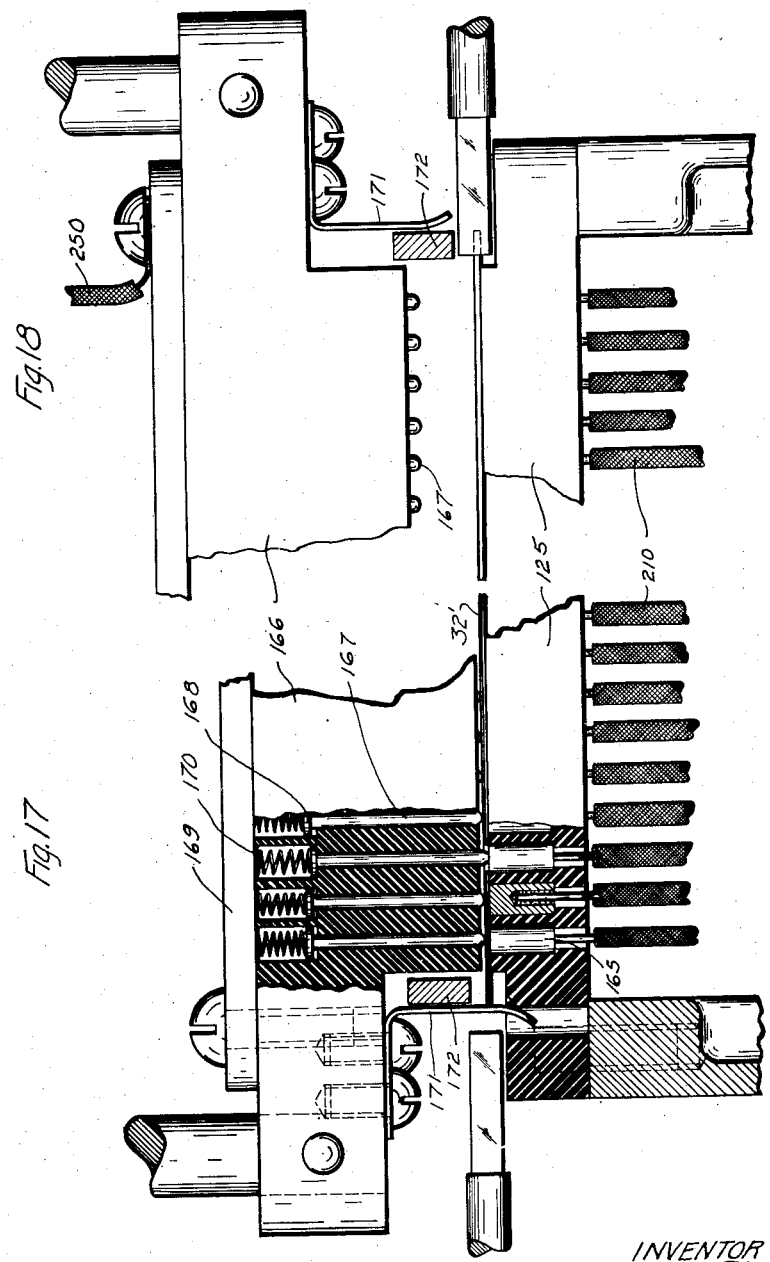

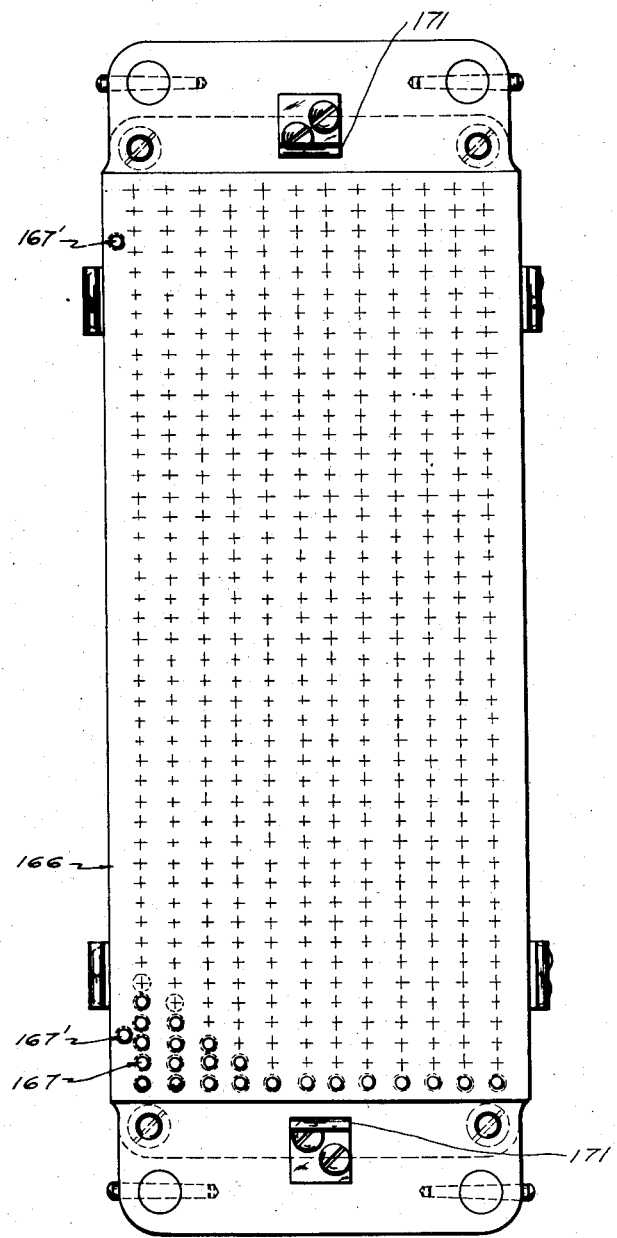

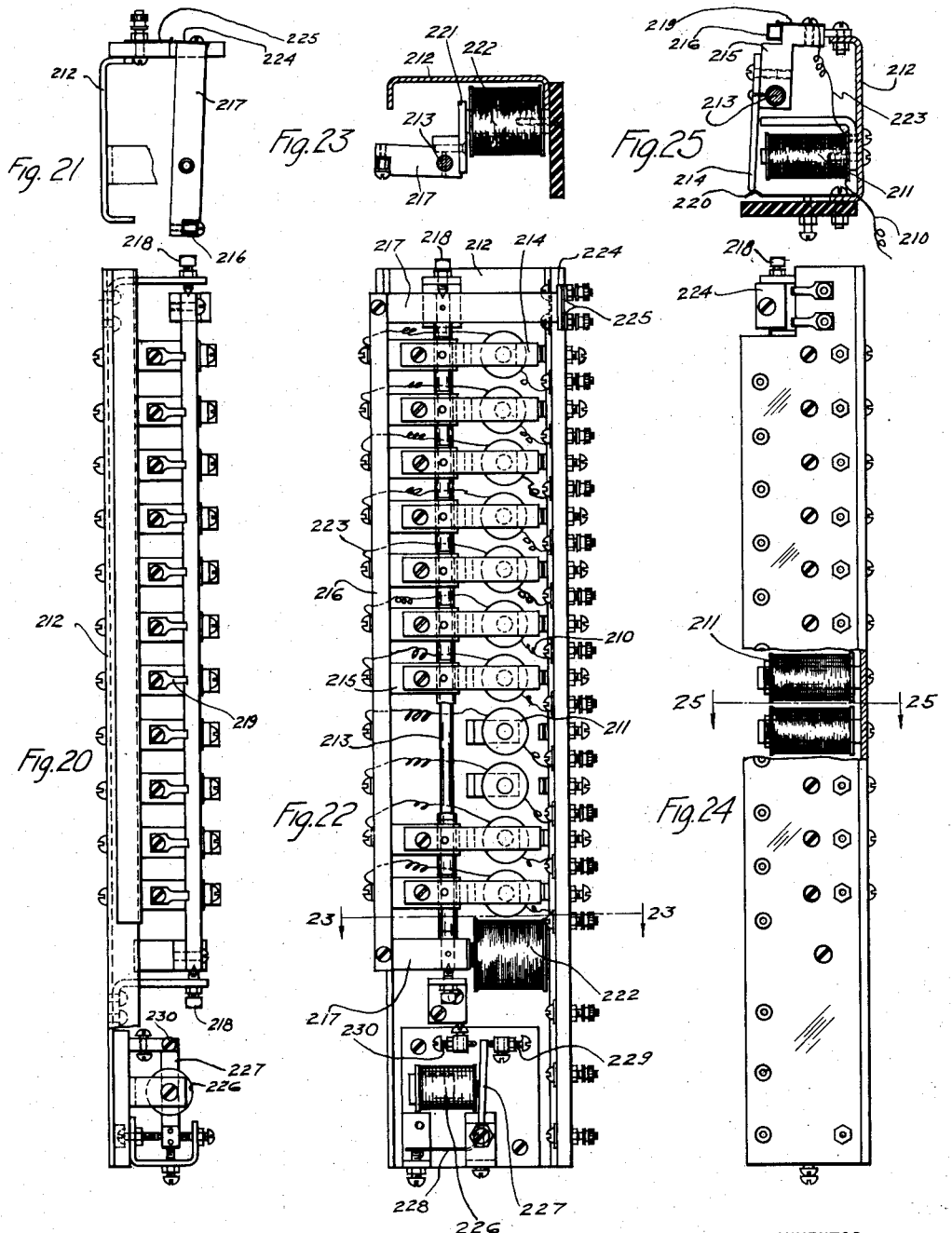

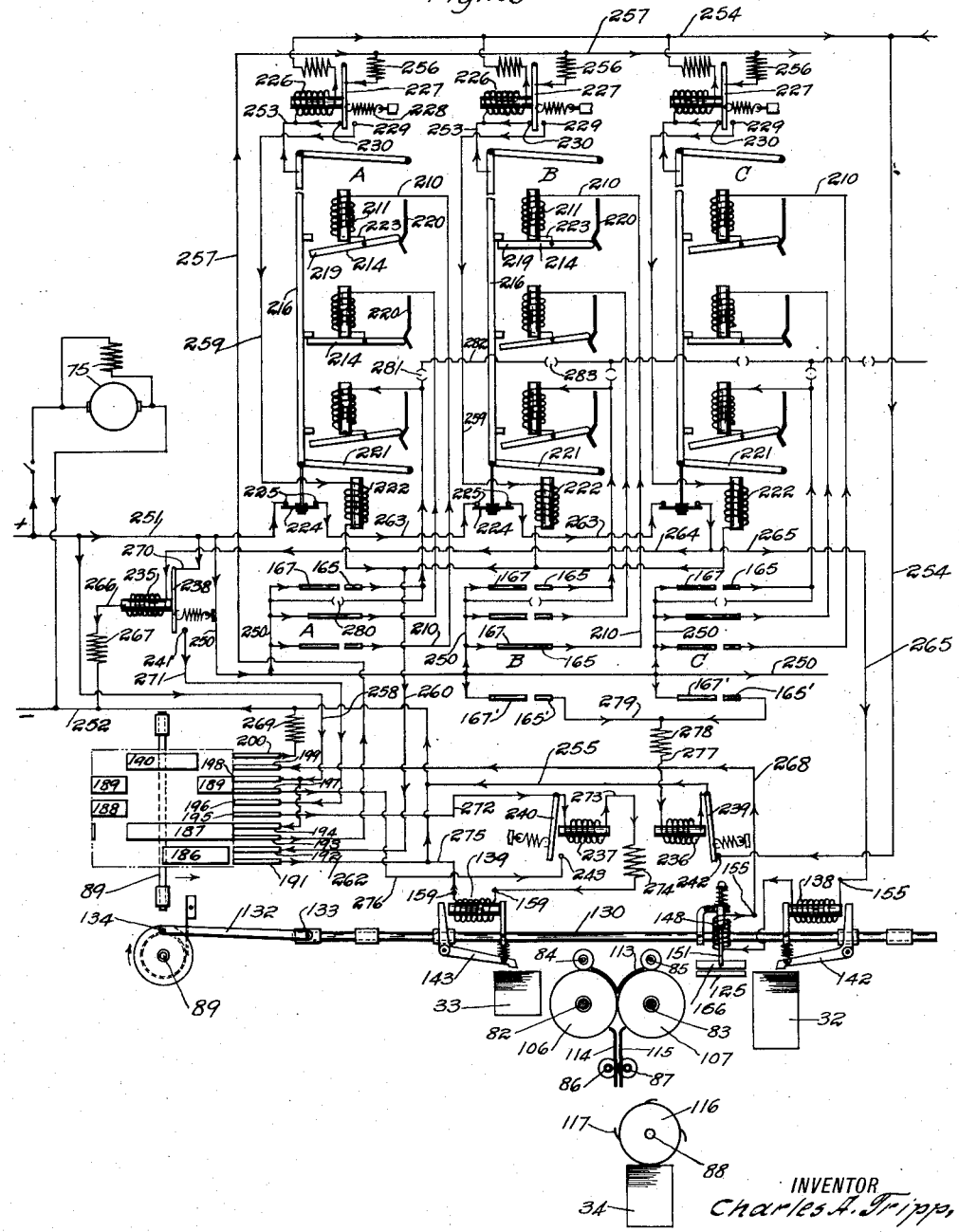

UNITED STATES PATENT OFFICE.

CHARLES A. TRIPP, OF INDIANAPOLIS, INDIANA, ASSIGNOR, BY DIRECT AND MESNE ASSIGNMENTS, OF ONE-HALF TO J. E. MERION, OF PITTSBURGH, PENNSYLVANIA, AND ONE-HALF TO ORANGE E. McMEANS AND CHARLES A. TRIPP, BOTH OF INDIANAPOLIS, INDIANA.

STOP-CARD-INSERTING MACHINE.

1,208,051. Specification of Letters Patent. Patented Dec. 12, 1916.

Application filed June 26, 1915. Serial No. 36,597.

*To all whom it may concern:*

Be it known that I, CHARLES A. TRIPP, a citizen of the United States, residing at Indianapolis, in the county of Marion and State of Indiana, have invented a new and useful Stop - Card - Inserting Machine, of which the following is a specification.

In keeping complicated records, and in auditing such records, as for instance in census work and in railway accounting work, there is a growing use of the punched card system, wherein there is a card for each individual item of record, such as a person in census work or a single freight shipment in railway accounting work, and holes or groups of holes are punched in different locations on such card to denote the different characteristics of the particular items of which a record is kept on that card. These hole locations are usually arranged in columns, and a column or a group or "field" of associated columns is used to record a particular characteristic of the item, usually on the decimal system. Thus, for instance, a railroad will give different commodities arbitrary numbers, and if the total number of commodities does not exceed 999 three columns will be sufficient to take care of the commodity characterization, by different punchings of the digit hole locations in these columns. Also, each column may have one or more additional hole locations, for supervisory control; for instance, sometimes some particular characteristic will not be recorded, so that none of the digit hole locations in the "field" in which a record of that characteristic is kept will be punched. Instead, an "X" hole is punched, denoting that no record is made in the "field" controlled by such "X" hole. The groupings of the columns for different card systems will be different, of course.

Machines have been devised and are in successful use for sorting and counting these cards according to any desired grouping. These sorting machines arrange the cards in groups according to any desired classification, and then the cards of one group are usually separated from the cards of another group by "stop cards", which are usually blank, for the counting machines require such stop or division cards in order to stop the counting at the end of each group, so that the total or sub-total may be read off or recorded, and the counting device, if desired, set back to zero for counting the next group. Heretofore, so far as I am aware, it has always been necessary to use these stop cards and to insert them by hand. This is a tedious operation, requiring considerable skill and care in the "needling" operating by which the groups are separated.

It is the object of my present invention, to provide an automatic device for separating the successive groups of cards and inserting these stop cards between adjacent groups.

It is my further object to provide for the automatic insertion of such a stop card whenever there is a change in the punching in any "field" as the punched cards are fed successively through the machine, or when there is any change in the punching in any desired field or in any one of any desired combination of "fields".

In carrying out my invention, I provide means for successfully feeding the punched cards through my machine, and means which is controlled by the punchings in the cards as they pass through the machine for intermitting the feeding of the punched cards whenever a card is reached in which the punching in the "fields" which are controlling the device is in any way different from that of the preceding card; and in the interim of the feeding of the punched cards, in the machine shown, automatically feeding a stop card or cards into the machine between the last preceding punched card and the punched card which caused the intermitting of the feeding of punched cards.

In the preferred form of my invention, the sorted punched cards are arranged in one pile, the stop cards to be inserted in another pile, and between these two piles is a pile of the cards discharged from the machine, with the stop cards inserted in proper positions; and a reciprocating feeding device is arranged to operate on the first two piles of cards to feed the end card of the pile of stop cards to the discharge mechanism, and to feed the end card of the pile of punched or record cards on to a control plate and from thence to the discharge mechanism; and means coöperates with this control plate through the holes in the card on the control plate during the time it remains there for controlling electro-magnetic relay devices which in turn, preferably in conjunction with a commutator which operates synchronously with the feeding mechanism, control the feeding mechanism to cause it to become inoperative on the pile of punched cards and on the card on the control plate and to operate to feed a card or cards from the pile of stop cards to the discharge mechanism when the controlling punching in any card on the control plate differs in any way from that in the preceding card thereon.

The accompanying drawings illustrate my invention, in its preferred embodiment.

Figure 14:
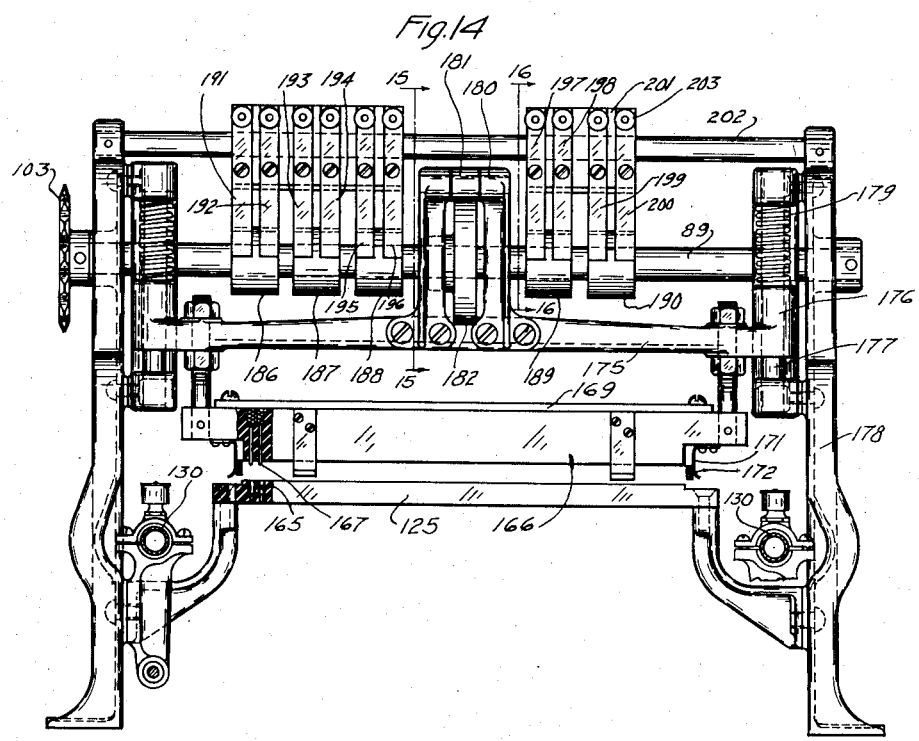
Figure 15:
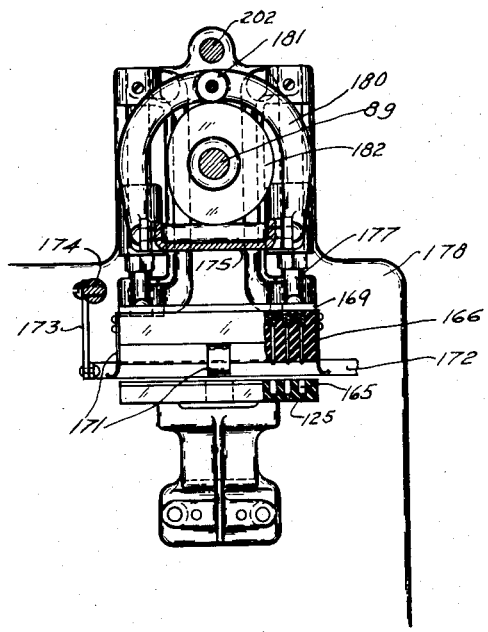
Figure 16:
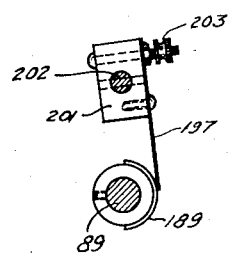

In these drawings, Figure 1 is a front elevation of a stop card inserting machine embodying my invention; Fig. 2 is an end elevation of such machine; Fig. 3 is an enlarged fragmentary detail, showing the discharge mechanism, being a section substantially on the line 3—3 of Fig. 5; Fig. 4 is a diagram showing the driving gearing for the rotating parts; Fig. 5 is a section on the line 5—5 of Fig. 3; Fig. 6 is a sectional detail, on the line 6—6 of Fig. 3; Fig. 7 is a section on the line 7—7 of Fig. 8, showing the means for supporting one of the piles of cards; Fig. 8 is a section on the lines 8—8 of Figs. 1 and 7; Fig. 9 is a plan view of the feeding mechanism, partly broken away; Fig. 10 is a front elevation of the mechanism shown in Fig. 9; Fig. 11 is a section on the lines 11—11 of Figs. 9 and 10, showing a detail of the feeding apparatus for feeding the punched card from the control plate to the discharge mechanism; Fig. 12 is a section on the lines 12—12 of Figs. 9 and 10; Fig. 13 is a plan view of the controlling commutator; Fig. 14 is an elevation of such commutator, showing its relation to the control plate and the plunger-carrying plate; Fig. 15 is a section on the line 15—15 of Fig. 14; Fig. 16 is a section on the line 16—16 of Fig. 14; Fig. 17 is a fragmentary partial section through the control plate and the plunger-carrying plate, showing the coöperation of the two plates and an interposed card, with the plunger-carrying plate in its lower position; Fig. 18 is a somewhat similar view, showing the other end of the two plates, in elevation, with the plunger-carrying plate raised; Fig. 19 is a bottom view of the plunger-carrying plate, showing some of the plungers diagrammatically; Fig. 20 is a side elevation of one of the sets of relay devices, corresponding to a column of plungers; Fig. 21 is an end view of the part shown in Fig. 20; Fig. 22 is a front elevation of the relay devices shown in Fig. 20; Fig. 23 is a section on the line 23—23 of Fig. 22; Fig. 24 is a side elevation of such set of relay devices, being taken from the opposite side from Fig. 20; Fig. 25 is a section on the line 25—25 of Fig. 24; and Fig. 26 is a diagram showing the electrical connections, though for a number of hole locations in each column and for a number of columns which, for simplicity in the diagram, is much smaller than actually used.

The frame of the machine comprises legs 30 and a top plate or table 31, and supports the entire mechanism. The table 31 is provided with supports for the three piles of cards, that is, the sorted punched cards 32, near one end of the table, the stop cards 33, near the other end of the table, and the discharged cards 34, with the stop cards inserted in proper positions between the different groups of punched cards, near the middle of the table, and between the piles 32 and 33. The tops of all three piles are maintained at constant levels, the tops of the piles 32 and 33 being above the table 31 and that of the pile 34 being below such table; the piles 32 and 33 may project through the plane of the table 31. Each pile of cards is carried by a card-supporting mechanism, which maintains the top of the pile at a constant level. The card-supporting mechanisms for the piles 32 and 33 are substantially identical, save that that for the pile 32 will accommodate more cards. In each of these two card-supporting mechanisms there is a pair of end plates 35 attached to the table 31 and located at the ends of the cards 32 or 33 and at the ends of a hole through the table 31 for allowing vertical passage of the cards. This pair of end plates 35 supports a top plate 36, which bears against the upper surface of the top card near the ends and along a line near the middle and parallel with the ends, being cut away intermediately, and at the edge toward the center of the table is provided with a bridge 37, which is likewise cut away. The pile of cards rests on a bottom plate 38, which is carried by two sliding members 39 which slide vertically along slide bars 40 supported by the end plates 35 and extending from the upper edge of such end plates down through the opening in the table 31 for a sufficient distance to accommodate a pile of cards of the desired height. The sliding members 39 are provided with ears to which are rigidly attached downwardly extending members 41, the lower ends of which are bent to provide attaching fingers for the lower end of tension springs 42, the upper ends of which are carried by lugs 43 from the end members 35. One of the downwardly extending members 41 has a lateral finger 44, which carries an upwardly extending rod 45 the upper end of which bears against a piston 46 in a dash pot 47 mounted on the adjacent slide 40, such piston being provided with a central hole 48 which is closed by the upper end of the rod 45 when such rod is in engagement with the piston. This dash pot acts as a cushion to prevent the bottom plate 38 from coming violently into contact with the top plate 36. The lower ends of the slide bars 40 are connected by a cross bar 49, which is attached to an L-shaped guide bar 50, the upper end of which rests in a slot in the lower edge of a guide plate 51 carried by and vertically adjustable on the edges of the end plates 35 toward the center of the table, this adjustment being provided by adjusting screws 52 carried by lugs on the end plates 35 and bearing against lugs 54 on the guide plate 51. The cards 32 and 33 are guided by the slide bars 40, the guide bar 50, and the guide plate 51, and as they approach the top of the pile and are also engaged at their rear edges by guide fingers 55 to insure the alinement of the cards. The adjustment of the guide plate 51 provides for a space between its upper edge and the lower edge of the middle bar of the bridge 37 just sufficient to permit the edgewise passage of a single punched card or of the desired number of stop cards, which passage is effected by the feeding mechanism hereinafter described.

The supporting mechanism for the card pile 34 is of the same general type. In this card supporting mechanism, there is a vertical slide rod 60, which at its lower end is provided with a transverse member 61 the ends of which are attached to the lower ends of guide bars 62 the upper ends of which are attached to fittings 63 mounted on a cross rod 64 carried by the frame 30, which cross rod also carries the fitting 66 into which the upper end of the slide rod 60 is mounted. A slide 67 is mounted on the slide rod 60, for vertical sliding movement therealong, and is provided with a card-supporting plate 68 on which the discharged cards are supported. The slide 67 carries an upwardly extending rod 69, exactly like the rod 45, and coöperating in a similar way with the piston 70 of a dash pot 71 which is also carried by the fitting 66. The slide 67 and the card-supporting plate 68 are drawn upward by a tension spring 72. The guide bars 62 are sufficiently close together so as to engage the edge of the card near both ends, and withdraw it from the discharge wheels hereinafter described.

The power for moving the cards through the machine and for operating the various movable parts is furnished by a suitable motor 75, which is conveniently mounted below the table 31. A pulley 76 on the shaft of this motor is connected by a belt 77 to a pulley 78 on a main driving shaft 79, which extends transversely of the machine. Parallel to this shaft 79 are idler shafts 80 and 81, main feed roll shafts 82 and 83, supplemental feed roll shafts 84 and 85, discharge roll shafts 86 and 87, a discharge wheel shaft 88, and a commutator shaft 89. These various shafts are connected as shown in Fig. 4: Gears 90 on the shaft 79 mesh with gears 91 on the shaft 80, which gears 91 also mesh with gears 92 on the shaft 82 and gears 93 on the shaft 86; the gears 92 mesh with similar gears 94 on the shaft 83 and smaller gears 95 on the shaft 84, and the gears 94 also mesh with smaller gears 96 on the shaft 85; the gears 93 mesh with similar gears 97 on the shaft 87; a gear 98 on the shaft 80 meshes with an idler gear 99 on the shaft 81, which idler gear meshes with a gear 100 on the discharge wheel shaft 88; and a sprocket 101 on the shaft 82 is connected by a chain 102 to a sprocket 103 on the shaft 89. The shafts 83, 84, 85, and 87 are floating shafts, being carried in pivoted supports 104 and spring-pressed by adjustable springs 105 toward their coöperating shafts 82, 82, 83, and 86 respectively. The intermeshing gears allow the slight necessary movements of the shafts 84, 85, and 87. The shafts 82 and 83 carry interengaging rollers 106 and 107, the shafts 84 and 85 carry rollers 108 and 109 which engage the rollers 106 and 107, respectively, and the shafts 86 and 87 carry inter-engaging rollers 110 and 111. The gear ratios are such that the peripheral speeds of all these rollers are equal. The rollers 106 and 107 are continuous rollers, as is clear from Fig. 5, but the rollers 108, 109, 110, and 111 are not continuous throughout their length, but are formed of axially separated parts which project through openings in card-guiding plates 112, 113, 114, and 115 respectively. The plates 112 and 113 fit around the peripheries of the rollers 106 and 107 respectively but guide downward between such two rollers cards which are fed either from the left between such two rollers 106 and 108 or from the right between the rollers 107 and 109, and the plates 114 and 115 are vertical and parallel to form a chute which guides downward the cards which are discharged edgewise from between the rollers 106 and 107. The rollers 110 and 111 feed these downwardly discharged cards from this chute to the discharge wheel 116, which is mounted on the shaft 88. This discharge wheel consists of two separated parts, as is clear from Figs. 5 and 6, each of which parts is provided around its periphery with a plurality of pivoted spring fingers 117, corresponding fingers 117 on the two parts of the discharge wheel being connected by yokes 118 so that the two corresponding fingers 117 on the two parts may be drawn inward by a tension spring 119 connected to the fingers on one of such parts and may be forced outward by cam surfaces 120 on the fingers on the other of such parts. The cam surfaces 120 coöperate with a cam roller 121 carried by a fixed finger 122 suitably supported on the frame 30, so that as the shaft 88 rotates the fingers 117 are successively forced outward as they pass under the lower end of the chute 114—115, with the plane of which the discharge wheel 116 is tangent, so as to receive the edge of the card discharged from such chute, and then are drawn inward by the springs 119 to grip the edge of such card and carry the card from a vertical to a horizontal plane, until the edge of the card strikes the guide bars 62 and such guide bars stop the card and draw it out of the grasp of the fingers 117, leaving it on the top of the pile of discharged cards.

The feed rollers 106 and 107 as well as the rest of the discharge mechanism are located between the two card piles 32 and 33, and the horizontal plane tangent to such rollers 106 and 107 at their points of tangency with the supplemental feed rollers 108 and 109 is the plane of the top cards of the two card piles 32 and 33. The card pile 33 is close to the feed roll 106, (to the left thereof in Figs. 1 and 3) and the card pile 32 is located to the right of the feed roller 107, at a distance therefrom substantially equal to the width of a card, thus leaving a space for a control member 125, which I prefer to make as a flat plate the upper surface of which is in the horizontal plane of the top cards of the piles 32 and 33 so that the top card in the pile 32 can be slid on to such control plate, and thence between the rollers 107 and 109.

The feeding of the cards is accomplished by a reciprocating feeding mechanism, such as shown in detail in Figs. 9, 10, 11, and 12. This feeding mechanism is carried by a reciprocating frame 130, which is mounted in brackets 131 suitably supported on the table 31. A pair of connecting rods 132 join pivot pins 133 on this frame and crank pins 134 on crank wheels 135 on the shaft 82, so that the reciprocating frame makes one complete reciprocation for each rotation of the feed rollers 106 and 107. The frame 130 is provided near its ends with tubular cross bars 136 and 137, which are slightly higher than the body of the reciprocating frame. These two cross cars have fixed thereon electromagnets 138 and 139 respectively, the armatures 140 and 141 of which are carried by pivoted feed fingers 142 and 143 respectively, which are pivotally mounted on the rods 136 and 137 respectively. The feed fingers 142 and 143 are drawn upward by springs 144, but are pulled downward against the action of such springs when the armatures 140 and 141 are attracted by electro-magnets 138 and 139. The movement of the feed fingers 142 and 143 may be adjusted by screws 145, carried in a fixed arm 146 on each of the rods 136 and 137, which screws act on opposite sides of a finger 147 projecting from the armature 140. The feed fingers 142 and 143 are bifurcated, as is clear from Fig. 9, so that they may pass under the bridge 37 on either side of the middle arm thereof. These feed fingers 142 and 143, when depressed by the energization of their associated magnets 138 and 139 respectively, which are never energized simultaneously, act on the rear edge of the top card or cards of the card piles 32 and 33 respectively, to force such top card or cards to the left and to the right respectively, the feed finger 143 forcing the top card or cards of the pile 33 directly between the feed rollers 106 and 108, and the feed finger 142 forcing the top card of the pile 32 on to the control plate 125. The longitudinal bars of the frame 130 have fixed thereon solenoids 148, the cores 149 of which are horizontally slidable, transversely of the movement of the reciprocating frame 30. These cores 149 are spring-pressed outwardly by springs 150, and are provided with nonmagnetic extensions 151 which when the cores 149 are drawn inward by the energization of the solenoids are projected inwardly past the rear corners of the card on the control plate 125, so that when the reciprocating frame 130 moves to the left such extensions 151 force the card on the control plate from the control plate and between the feed rollers 107 and 109 and also act as stops acting on the front corners of the card being fed from the pile 32 on to the control plate, to limit the forward movement of such card under the action of the feed finger 142. The two solenoids 148 and electro-magnet 138 are connected in series, conveniently by wires 152 which pass through the tubular members of the frame 130, and the ends of the wires 152 are connected to trolley wheels 153 which travel on fixed trolley wires 154 carried by the brackets 131 and suitably insulated therefrom, the ends of these trolley wires being provided with binding posts 155. The terminals of the electro-magnet 139 are connected by wires 156 to similar trolley wheels 157, which travel on similarly supported trolley wires 158, which are also provided with binding posts 159. The electro-magnet 139, when energized, is energized during the movement of the reciprocating frame 130 to the right; and the solenoids 148 and the electro-magnet 138, when energized, are energized during the movement of the reciprocating frame 130 to the left. The energization of these parts at the proper times is accomplished by mechanism hereinafter described.

The control plate 125 is of insulating material, suitably stationarily supported, and fixed in this insulating plate are any desired number of contacts 165, the upper surfaces of which are flush with the upper surface of the plate. These contacts 165 are connected as hereinafter described. The contacts 165 are usually arranged in groups or columns, with any desired number of columns, and usually with ten or more contacts in a column when the decimal system is used. Coöperating with the control plate 125 is a vertically reciprocating plunger plate 166, which is also of insulating material and which carries a plurality of plungers 167, which normally project downward slightly beyond the lower surface of the plunger plate 166 and are provided with heads 168 between which and a cover plate 169 covering the entire set of plunger holes are located springs 170, one for each plunger, for pressing such plungers downward. The heads 168 are in enlarged portions at the top of the plunger holes in the plate 166, the shoulders formed by the bottoms of such enlarged portions coöperating with the heads 168 to limit the downward movement of the plungers. The plate 169 is preferably a metal plate, which electrically connects all the plungers 167 in common. There is one plunger 167 for each of the contacts 165, the plunger and its associated contact being in vertical alinement. When the plunger plate 166 descends, with one of the punched cards 32' on the control plate 125, the plungers 167 which are not opposite holes in such card are raised in the plunger plate 166, and are prevented from engaging their associated contacts 165, by the interposed card; but the plungers 167 which are opposite holes in such card pass through such holes and engage their associated contacts 165 to complete electric circuits. The plunger plate 166 carries guide fingers 171, which act on the sides and ends of the card on the control plate 125 to position such card, the guide fingers at the ends of the card passing down outside of horizontal guide rods 172, which are located over the cards near their ends to keep the cards from buckling as they pass on to the control plate. The guide rods 172 are fastened at one end to the bridge 37, and at the other are attached to depending fingers 173 carried by a fixed transverse bar 174. The plunger plate 166 is adjustably mounted on a frame 175, which is provided with perforated slide lugs 176 mounted on slide rods 177 suitably mounted in a superstructure 178 carried by the table 31. Compression springs 179 surround slide rods 177 above the lugs 176, and tend to force the frame 175 and plunger plate 166 downward. The frame 175 is provided with a yoke 180, which extends over the commutator shaft 89 and is provided with a roller 181 which rides on a cam 182 fixed on such shaft 89, so that at each rotation of the shaft 89, which rotates at the same angular speed as the shafts 82 and 83, the frame 175 and the plunger plate 166 make a complete vertical reciprocation. Thus the rate of reciprocation of the plunger plate 166 is the same as that of the horizontally reciprocating frame 130. The vertically reciprocating plunger plate 166 descends to its lowermost position and then rises to its uppermost position, making a complete reciprocation, during the movement of the horizontally reciprocating frame 130 to the left (Figs. 1, 10, and 26).

The commutator shaft 89 also carries a plurality of commutator segments 186, 187, 188, 189, and 190 with which coöperate spring contact fingers 191 and 192, 193 and 194, 195 and 196, 197 and 198, and 199 and 200, respectively. The commutator segments 186, 187, 188, 189, and 190 are shown developed near the lower left hand corner of Fig. 26, which also shows the commutator as a whole and its relationship to the shaft 89, the connecting rod 132, and the reciprocating frame 130. The contact fingers 191 to 200 inclusive are mounted on insulating blocks 201 carried by a fixed transverse rod 202, and each of such fingers is provided with a binding post 203.

Each contact 165 in the control plate 125 is connected by a wire 210 to one terminal of an electro-magnet 211, there being one such magnet 211 for each contact 165. These magnets 211 are arranged in groups, corresponding to the columns of the contacts 165, and the magnets of each group are mounted in a row in a frame 212. Along this frame extends a rod 213 on which are mounted a plurality of armatures 214, one for each of the magnets 211, such armatures being separately rotatable on such rod 213. Conveniently, the armatures 214 are mounted on insulating blocks 215, which are in turn loosely mounted on the rod 213, and the rear ends of these blocks 215 are notched to receive a square bar 216 which is carried at its ends by two bars 217 which are pinned to the rod 213, such rod being rotatably mounted on pivot pins 218. Each block 215 also carries a contact finger 219, which normally engages the bar 216 (as apparent from Fig. 25), but which may be disengaged from such bar when such bar is swung in a counter-clockwise direction (Fig. 25) relative to the block 215 carrying such finger 219. The ends of the armatures 214 engage hooked leaf springs 220, which act to hold such armatures in either position in which they are put. One of the bars 217 carries an armature 221 for a magnet 222, which acts to turn the rod 213 and the bar 216 in a clockwise direction (Figs. 23 and 25), the magnets 211 acting to turn their individual armatures in a counterclockwise direction and to carry the rod 213 and bar 216 with any one of them which is so turned. Thus when any magnet 211 is energized, it attracts its armature 214 and turns such armature in a counterclockwise direction (Fig. 25), thus also moving the rod 213 and bar 216 in such counterclockwise direction and disengaging the bar 216 from all the contact fingers 219 except the one which is carried by the block 215 associated with that one of the magnets 211 which is energized. Each finger 219 is connected by a wire 223 with the opposite terminal of the associated magnet 211 from that which is connected to the wire 210, so that this movement of the bar 216 disconnects all the magnets 211 of that particular group save the one which was energized to produce such movement. The other of the bars 217 from that which carries the armature 221 carries a bridge contact 224, which interconnects two contact fingers 225 when the rod 213 and bars 216 and 217 are turned in a counterclockwise direction (Figs. 21, 23, and 25), but disconnects such two contacts when such parts are swung in the clockwise direction. In each frame 212 there is also mounted a magnet 226, which has a current-carrying armature 227 which is normally pressed by a spring 228 against a contact 229 but may be drawn away from such contact 229 and into engagement with a contact 230 when the magnet 226 is energized. The various groups of magnets, of which there are forty-five with twelve in a column when a plunger plate of the size shown in Fig. 19 is used, (though the number in a column may be anything desired, columns of eleven being shown in Figs. 20–25,) are carried in any suitable container or containers 231 located within the space within the legs 30 of the main frame, these containers being indicated in dot and dash lines in Fig. 1.

In addition to the groups of selecting magnets 211, each group having a resetting magnet 222 and a control magnet 226, the system also has three additional magnets 235, 236, and 237, which are shown in diagram in Fig. 26. These three magnets have armatures 238, 239, and 240 respectively, the first two of which are drawn by their associated magnets, when the latter are energized, away from contacts 241 and 242 respectively, and the third of which is drawn by its associated magnet, when the latter is energized, into engagement with a contact 243, such armatures all being spring-pressed in the opposite direction from that in which they are drawn by their associated magnets.

The general system of connections is shown in Fig. 26, which, however, only includes three columns of selecting magnets, and three selecting magnets in a column, as this is sufficient to show the general arrangement, and the entire number of columns and magnets would merely be confusing. The plungers 167 are all connected in common through their springs 170 and the cover plate 169 to a wire 250, which is connected to one side (the positive side) 251 of the supply circuit 251—252. The bar 216 of each group of selecting magnets is connected by a wire 253 to the contact 230 associated with the same group and also to one terminal of the control relay magnet 226 of that group, the other terminal of such control relay magnet being connected in common with the similar terminals of the other control relay magnets to a wire 254, which leads to the contact 242. The armature 239 which coöperates with the contact 242 is connected by a wire 255 to the negative side of the supply circuit 252. The armatures 227 are connected through a resistance 256 in common to a wire 257, which is connected to the commutator finger 193, the commutator finger 194 being connected by a wire 258 to the positive supply wire 251, so that when the contacts 193 and 194 are bridged by the commutator segments 187, the armatures 227 are all connected to the positive side of the circuit. The contact 229 of each group of magnets is connected by a wire 259 to one terminal of the resetting magnet 222 of that group, the other terminal of such resetting magnet being connected in common with the similar terminals of the other resetting magnets to a wire 260, which leads to the commutator finger 192, the commutator finger 191 being connected by a wire 262 to the negative side 252 of the circuit. The contacts 225 are connected by wires 263 in a series circuit, which must include all the bridging contacts 224 in order to be closed, this series circuit at one side being connected to the positive supply wire 2ol and at the other to two wires 264 and 265; the wire 264 leads to one terminal of the magnet 235, the other terminal of which is connected by a wire 266 and a resistance 267 to the negative supply wire 252; the wire 265 leads to one of the binding posts 155, thus being connected to one side of the circuit including the magnet 138 and the solenoids 148, the other binding post 155 being connected by a wire 268 to the commutator finger 199, which may be connected by the commutator section 190 to the commutator finger 200 which in turn is connected through a resistance 269 to the negative supply wire 252. The armature 238 is connected by a wire 270 to the positive supply wire 251, and the contact 241 is connected by a wire 271 to the commutator finger 196, the coöperating commutator finger 195 (which may be connected to the finger 196 by the commutator segment 188) being connected by a wire 272 both to the armature 240 and to one side of the magnet 237; the other terminal of such magnet 237 is connected by a wire 273 through a resistance 274 to one of the binding posts 159, whence a circuit passes through the stop card feed magnet 139 to the other binding post 159, which is connected by a wire 275 to a negative supply wire 252. The commutator contact 198 is connected by the wire 258 to the positive side 251 of the supply circuit, and the commutator finger 197 (which may be bridged with the finger 198 by the commutator segment 189) is connected by a wire 276 to the contact 243. One terminal of the magnet 236 is connected to the armature 239, and the other terminal is connected through a wire 277 and a resistance 278 to a wire 279 which leads to two supplemental contacts 165' located near the edge of the plate 166 and near its opposite ends, and cooperating with similarly located plungers 167' in the plunger plate 166. These plungers 167' and the contacts 165' coöperate to insure that the controlling card is in proper position on the control plate, as a plunger 167' will only engage the corresponding contact 165' when the card is twisted; at other times, or when the card is straight on the control plate, being separated by the thickness of the card. Sometimes it is desirable to cut out a row of contacts 165, and its associated group of contacts, and for this purpose a plug switch 280 is provided for each column of such contacts, one side of such plug switch being connected to the wire 250 and the other to one of the wires 210 for that particular group. By putting the plug in this plug switch, a permanent connection is made from such wire 210 to the positive side of the circuit. It is also sometimes desirable that a contact 165 in one column have supervisory control over that column and one or more adjacent columns, which with the first column form a "field" in which a particular characteristic of the item is recorded. For this purpose, this supervisory contact, which is the upper contact in each column in Fig. 26, has its associated wire 210 connectible by a plug switch 281 to a wire 282, whereby any desired number of corresponding wires 210 of other columns may be connected in parallel to the single supervisory contact 165 of the first column. The wire 282 is provided with a number of plug switches 283, one between each wire 210 connected to it and the corresponding wire of the adjacent column, so that by manipulation of the plug switches 281 and 283 any desired number of groups each including any desired number of adjacent columns may be provided by the single cross connecting wire 282.

The operation is as follows: The sorted punched or record cards are put in the pile 32. The stop or division cards are put in the pile 33. As these cards are fed through the machine, more cards are placed at the bottom of the piles. The motor 75 drives the various parts, and causes the feed rolls 106 and 107, and the commutator shaft 89 and the parts carried thereby, to make one rotation, and the horizontally reciprocating frame 130 and the vertically reciprocating plunger plate 166 each to make one complete reciprocation, for each card which is fed through the machine and discharged by the rolls 106 and 107 through the chute 114—115 to the discharge wheel 116 and laid thereby on the top of the card pile 34. The diagram in Fig. 26 shows the relative position of the parts when the reciprocating frame 130 is at the middle point of its travel when moving to the right, at which time the plunger plate 166 is in its lowermost position; and the commutator carried by the shaft 89 is shown both in elevation, to show the relation between its movement and that of the reciprocating frame 130, and in development, to show the relative position of the commutator segments and the commutator fingers when the reciprocating frame 130 is in the position shown. As the frame 130 moves back and forth, it may on its movement to the left move the top punched card from the pile 32 on to the control plate 125, and the preceding punched card, if there was one, from the control plate 125 to the discharge mechanism, if the magnet 138 and the solenoids 148 are energized during such movement; and it may on its movement to the right move the top stop card or desired number of stop cards from the pile 33 into the discharge mechanism, if the magnet 139 is energized during such movement. Assume that the machine has already been in operation, and that during the preceding movement of the frame 130 to the left a punched card from the pile 32 has been moved on to the control plate 125. In consequence, the plunger plate 166, which has descended from its uppermost to its lowermost position by the action of the springs 179 and the cam 182 during the just completed first half of the movement to the right of the frame 130, has encountered the card which is resting on the control plate 125, and the several plungers 167, which are shown separately from the plunger plate 166 in the diagram of Fig. 26, have either been pushed back in their sockets against the action of the springs 170 or have passed through holes in the card to engage the corresponding contacts 165 in the plunger plate 125, according as they have come opposite unperforated or perforated parts of the card, respectively. In the simplified diagram in Fig. 26, which shows the connections for only three columns of plungers, which may be called columns A, B, and C respectively, and for only three plungers in each column, it is assumed that holes come opposite the second plunger in column A, the third plunger in column B, and the second plunger in column C, so that those three plungers have passed through the holes in the card on the control plate 125 and engaged their coöperating contacts 165. This has completed circuits for the corresponding magnets 211. Tracing this circuit for column B, say, the circuit is from the positive supply wire 251 through the wire 250, the cover plate 169, the third plunger 167 in column B (numbering from the top) the corresponding wire 210, the third selecting magnet 211 (numbering from the bottom) in the corresponding column B of the selecting magnets, the wire 223 from such magnet, the contact finger 219 carried by the armature 214 of such magnet, the bar 216 for the magnet column B, the wire 253, the control magnet 226 for column B, the wire 254, the contact 242, the armature 239, and the wire 255 to the negative supply wire 252. Similar circuits are completed for each column of magnets. The third selecting magnet 211 in column B and the control magnet 226 for such column are thus energized, (as are also one selecting magnet 211 and the control magnet 226 for each of the other columns,) and attract their armatures 214 and 227 respectively. The movement of the armature 214 also moves the bar 216 of column B, to disengage such bar from the contacts 219 corresponding to the other selecting magnets 211 of such column and to cause the bridge contact 224 to interconnect the two contacts 225. A similar action occurs in all the other columns.

The movement of the armature 227 of each column causes it to be disengaged from the contact 229 and to engage the contact 230; this completes a branch circuit from the positive supply wire 251 to the wire 253 in shunt to the plungers 167, contact 165, wire 210, and selecting magnet 211 of that column, so that when later such plungers 167 move out of engagement with the contacts 165 there will be no arcing, because there is no breaking of a circuit carrying appreciable current, and the control magnet 226 will not be immediately deënergized. This branch circuit from the wire 251 is by way of the wire 258, commutator finger 194, commutator segment 187, commutator finger 193, wire 257, the resistance 256 of the magnet column B, the armature 227, and the contact 230; and it remains closed as long as the commutator segment remains in engagement with the commutator fingers 193 and 194, which engagement took place a very short time before the plungers 167 engaged the contacts 165 and continues for about 270° of commutator rotation after such engagement, or until the reciprocating frame 130 has about completed its movement to the left. Thus the circuit for the magnet 226 is closed by the engagement of a plunger 167 with a contact 165, and remains closed until the commutator segment 187 passes out of engagement with the commutator fingers 193 and 194, or for about three-fourths of a revolution of the commutator. A similar set of operations takes place for each column of selecting magnets, all the columns being controlled in common by the commutator segment 187. The engagement of the several contacts 225 by the bridge contacts 224 closes a series circuit from the positive supply wire 251 through such contacts 224 and 225 and the wire 263 to the wires 264 and 265.

This series circuit requires for its completion that all the bars 216 of the various columns be raised (Fig. 26), and remains closed while such bars remain raised. The wire 264 leads to the magnet 235 which is connected to the wire 266 and the resistance 267 to the negative supply wire 252, so that such magnet is energized continuously so long as all the bars 216 are raised, but is deënergized as soon as any one of such bars is lowered. The magnet 235 when energized holds its armature 238 out of engagement with the contact 241, thus holding open the initial circuit for the stop card feed magnet 139, which circuit will be traced later. The wire 265 leads to the punched card feed magnet 138 and the punched card discharge solenoids 148, and thence by the wire 268 to the commutator finger 199, which in the position of the parts shown in Fig. 26 is not engaged by the commutator segment 190 but which is engaged by such segment 190 and connected thereby through the commutator finger 200 and the resistance 269 to the negative supply wire 252 during the 180° of commutator movement which begins at a point 90° subsequent to the position shown in Fig. 26, or during the movement of the reciprocating frame 130 to the left.

The movements of the armatures 214 and 227, and also of the armature 238 if it is not already in the position shown, and the resultant making and breaking of circuits, has taken place almost instantaneously when the parts reach the position shown in Fig. 26. As the cycle of operations continues, the reciprocating frame 130 completes its movement to the right, and the commutator continues to rotate in the direction of the arrow. This causes the raising of the plunger plate 166 to its uppermost position by the time the reciprocating frame 130 has reached its right hand limit of movement, thus clearing the card on the control plate 125. When the commutator has rotated 90° and the reciprocating frame has reached its right hand limit of movement, the commutator segment 190 engages the commutator fingers 199 and 200 to complete the circuit for the magnet 138 and the solenoids 148, which circuit remains closed for the next 180° of the cycle, so that as the reciprocating frame 130 moves from its extreme right hand to its extreme left hand position the magnet 138 holds the feed finger 142 depressed to feed the top card from the pile 32 on to the control plate 135, and the solenoid 148 holds the laterally projecting fingers 151 in their innermost positions so that they will discharge the card already on the control plate 125 from such control plate into the discharge mechanism, where the feed rollers 107 and 109 grip such card and pass it down along the inner surface of the guide plate 113 into the chute 114—115, whence such card falls edgewise on and tangent to the discharge wheel 116 and is gripped by the finger 117 and carried around 90° thereby and laid upon the top of the pile of discharged cards 34.

When the reciprocating frame 130 reaches its left hand limit of movement, the commutator segments 187 and 189 pass out of engagement with their coöperating commutator fingers, thus causing the deënergization of the magnets 226, 138, and 148, so that the armatures 227 may swing back into engagement with the contacts 229 and remain there for the next 90° of the cycle, and the feed fingers 142 and 151 may move out of feeding position and remain so during the next 180° of the cycle or during the moving of the reciprocating frame 130 to the right. As the frame 130 now begins to move to the right again, the plunger plate 166 is again caused to descend, engaging the punched card which has been newly fed on to the control plate 125. If the punchings in this card are the same as in the previous card, the same plungers 167 pass through the holes in the card and engage their coöperating contacts 165, thus energizing the same magnets 211 as in the previous cycle. These magnets, however, already have their armatures attracted, and they are the only ones of the selecting magnet which can be energized at this time, as the circuits of the other selecting magnets are broken by the disengagement of their contact fingers 219 with the associated bars 216, so that the deënergization of these magnets 211 produces no movement of their armatures and of the bar 216, and the ensuing operations are the same as during the previous cycle; and as the cycle continues the card which produced it—the controlling card—is fed from the control plate 125 to the discharging mechanism and laid on top of the pile of discharged cards 34, and another punched card—which becomes the controlling card—is fed on to the control plate 125. This cycle of operations is repeated as long as the punchings in each successive controlling card are the same as those in the previous one.

When a card is fed on to the control plate 125, however, with controlling punchings in any way different from those in the preceding card, the plunger plate 166 when it descends on such card has at least one plunger 167 which previously passed through a hole in the card but is now held up by an unperforated portion of the card so that it does not engage with its coöperating contact 165. Assume that this plunger thus held up is the third plunger in column B. In consequence, the circuit for the third selecting magnet 211 in column B is not completed, and as the circuits for all the other selecting magnets 211 in such column are open at the contacts 219, because the bar 216 has been moved away from such contacts, no circuit for any selecting magnet in the column B can be completed and the control magnet 226 for such column cannot be energized. Therefore, the armature 227 of the control magnet 226 of column B remains in engagement with the contact 229, so that as soon as the parts have moved very slightly beyond the position shown, to bring the commutator segment 186 into engagement with the commutator fingers 191 and 192, by which time the plunger plate 166 has been moved sufficiently to disengage the plungers 167 from any of the contacts 165 which they may have engaged, a circuit is completed for the resetting magnet 222 of column B. This circuit is from the positive wire 251 through the wire 258, commutator finger 194, commutator segment 187, commutator finger 193, wire 257, resistance 256 (for column B), armature 227, contact 229, wire 259, resetting magnet 222, wire 260, commutator finger 192, commutator segment 186, commutator finger 191, and wire 262 to the negative supply wire 252. The resultant energization of the resetting magnet 222 of column B causes such magnet to attract its armature 221, thus moving the bar 216 of column B to normal position, thereby drawing the armature 214 of the previously energized magnet 211 of such column away from such magnet and causing the bar 216 to engage all the contact fingers 219 of such column to make possible the subsequent energization of any selecting magnet 211 of that column and moving the bridge contact 224 of that column away from its coöperating contacts 225 to break the series circuit leading by the wire 263 from the positive side of the circuit through the contacts 224 and 225 to the wires 264 and 265. These movements, however, do not occur until after the plunger plate 166 has started to rise, and the interengaging plungers 167 and contacts 165 have been separated. The breaking of said series circuit, by reason of the disengagement of the aforesaid bridge contact 224 from its contacts 225, opens at another point the already open circuit containing the magnets 138 and 148, so that when the commutator segment 190 engages the commutator fingers 199 and 200 such circuit will not be closed. In consequence, during the following movement of the reciprocating frame to the left, after a punched card with different punchings has been deposited on the control plate 125, the feed fingers 148 and 151 are not rendered operative and the same controlling card remains on the control plate 125 for the next cycle. The breaking of such series circuit also causes the deënergization of the magnet 235, so that the armature of such magnet swings into engagement with its cooperating contact 241. This does not immediately complete a circuit, but connects the positive supply wire 251 through the wire 270, the armature 238 and the wire 271 to the commutator finger 196, so that when the cycle has progressed 270° from the point shown in Fig. 26, or the reciprocating frame 130 has reached its left hand limit of movement after the descent of the plunger plate 156 upon a punched card with different punchings from the previous card, such commutator finger 196 is connected by the commutator segment 188 to the commutator finger 195, which is connected through the wire 272, magnet 237, wire 273, resistance 274, stop card feed magnet 139, and wire 275 to the negative supply wire 252, thus energizing such magnet 139 so that the stop card feed finger 143 is rendered operative. As stated, this occurs when the feed frame 130 is at its left hand limit of movement. Therefore, as the feed frame 130 now moves to the right, the stop card feed finger 143 pushes the top card or group of cards from the pile of stop cards 33 into the discharge mechanism, which discharges such stop card or cards on to the top of the pile of discharged cards 34, where it or they will be located between the last previously discharged punched card, which was the last of one group, and the next punched card to be discharged, which is the first card of the next group and is then on the control plate 125.

The circuit for the magnet 139 is maintained closed throughout the complete movement of the reciprocating frame 130 to the right, for at the same time that the magnet 139 is energized the magnet 237 is also energized, and draws its armature into engagement with the contact 243, which closes a circuit from the positive supply wire 251 through the wire 258, the commutator finger 198, commutator segment 189, commutator finger 197, wire 276, contact 243, and armature 240 to the wire 272, so that when the commutator segment 188 passes out of engagement with its coöperating commutator fingers the circuit for the stop card discharge magnet 139 is still maintained closed by the commutator segment 189, which remains in contact with its coöperating commutator fingers until the reciprocating feed frame 130 has reached its right hand limit of movement. During this movement of the feed frame 130 to the right, the plunger plate 166 has again descended upon the controlling card on the control plate 125, which is the same controlling card which was there during the previous cycle of operations. The same plungers 167 as during the last operation pass through the holes in this controlling card, but now a circuit for a selecting magnet in each column is completed, because the bar 216 of the column or columns (column B was taken for illustration) in which there had been a difference in the card punchings when that controlling card was placed on the control plate 125 have been drawn down to make possible the energization of any selecting magnet in such column or columns. The proper selecting magnets are therefore all energized, any depressed bars 216 are raised, and the cycle of operations continues as has already been described for a punched card. This operation is repeated as the successive punched cards are fed on to the control plate 125, as long as punchings in these cards remain the same, and is momentarily interrupted to cause a stop card or group of stop cards to be fed to the discharge mechanism whenever a punched card with different punchings is fed on to such control plate. Thus a stop card or group of stop cards is inserted in place between each group of punched cards.

Sometimes, it is desirable that the grouping be independent of certain columns. When such is the case, any desired column or columns which it is desirable to render ineffective may be cut out by having the corresponding plug or plugs 280 inserted. This produces a continuous connection of one of the magnets 211 of each of such columns to the positive supply wire, independent of the plunger operation, so as to make impossible the operation of the resetting magnets 222 of such columns.

Sometimes, it is desirable that a number of columns be interconnected for unitary supervisory control. Thus for instance, the columns A and B may be interconnected by inserting the plugs 281 for such column and the plug 283 between such columns. Assuming that the first plunger 167 in column A is the supervisory control plunger, the engagement of such plunger with its contact 165 not only causes the energization of the first selecting magnet 211 (counting from the bottom) in column A, but also the energization of the first selecting magnet in column B.

If a controlling card which is fed onto the controlling plate 125 is not positioned properly, one or both of the plungers 167' will engage its coöperating contact 165' when the plunger plate descends on such card. This closes a circuit from the positive supply 251 through the wire 250 and such plunger 167' and contact 165' to the wires 279, which is connected through the resistance 278 and wire 277 to one terminal of the magnet 276, the other terminal of which is connected by the wire 255 to the negative supply wire 262. The resultant energization of this magnet 236 causes it to draw its armature 239 away from the contact 242, thus interrupting the circuits of all the magnets 211 and 226, and causing stop cards to be inserted continuously until the operator notices that something is wrong in the positioning of the card and corrects it. The plungers 167' are slightly longer than the other plungers, so that they will come into engagement with their coöperating contacts 165' to produce the action just described before the column or plungers engage their contacts.

I claim as my invention:

1. In combination, discharge mechanism, a card-supplying device on each side of said discharge mechanism, means coöperating successively with the cards supplied from one of said card-supplying devices to said discharge mechanism, and means controlled by said last-named means for controlling the supply of cards from said two card-supplying devices to said discharge mechanism.

2. In combination, discharge mechanism, two card-supplying devices for supplying cards to said discharge mechanism, a feeding device for feeding cards from either of said card-supplying devices to said discharge mechanism, and means coöperating with the successive cards from one of said card-supplying devices for determining whether said feeding device shall feed to said discharge mechanism a card from one or the other of said card-supplying devices.

3. In combination, discharge mechanism, two card-supplying devices, a control member upon which the cards from one of the card-supplying devices are fed successively before reaching the discharge mechanism, and means controlled by each card when fed to the control member for determining whether such card or a card from the other card-supplying device shall be fed to the discharge mechanism.

4. In combination, discharge mechanism, two card-supplying devices, a control member, a feeding device for feeding cards successively from one of the card-supplying devices to the control member and then to the discharge mechanism and for feeding cards from the other card-supplying device to the discharge mechanism, and means controlled by the cards which pass on to the control member for selectively determining the action of the feeding device.

5. In combination, discharge mechanism, two card-supplying devices, a feeding device for feeding cards from either of said card-supplying devices to said discharge mechanism, and means coöperating successively with the cards from one of said card-supplying devices for selectively determining the action of said feeding device.

6. In combination, discharge mechanism, two card-supplying devices, a feeding device for feeding cards from either of said card-supplying devices to said discharge mechanism, and means coöperating successively with the cards from one of said card-supplying devices for intermitting the feeding of cards from said card-supplying device to said discharge mechanism and causing the feeding device to feed a card from the other card-supplying device to the discharge mechanism ahead of the card which produced such action when the card which produced such action differs in any controlling respect from the preceding card fed from the first card-supplying device.

7. In combination, two card-supplying devices, a feeding device for feeding cards from either of said card-supplying devices, said feeding device normally acting successively on the cards from one of said card-supplying devices, and means controlled by the successive cards from the card-supplying device from which the feeding device normally feeds cards for selectively determining whether said feeding device shall continue its normal feeding operation or shall stop its normal feeding operation and feed a card from the other card-supplying device.

8. In combination, discharge mechanism, two card-supplying devices, a control member, a feeding device for feeding cards from one of said card-supplying devices to said control member and from the control member to the discharge mechanism or for feeding cards from the other card-supplying device to the discharge mechanism, and means controlled by each card which is fed to the control member for selectively determining whether said feeding device shall feed the card on the control member on to the discharge mechanism and another card from the first card-supplying device to the control member or shall feed a card from the second card-supplying device to the discharge mechanism.

9. In combination, discharge mehanism, a control member, a feeding device for feeding cards to and from the control member and to the discharge mechanism, and means controlled by each card fed to the control member for selectively determining whether the feeding device shall feed said card on to the discharge mechanism or shall feed another card to the discharge mechanism ahead of such card.

10. In combination, discharge mechanism, a control member, a feeding device for feeding cards to and from the control member and to the discharge mechanism, and means controlled by each card fed to the control member for selectively determining whether the feeding device shall at once feed said card from the control member to the discharge mechanism or not.

11. In combination, discharge mechanism, a card-supplying device for supplying punched cards, a card-supplying device for supplying stop cards, a feeding device for feeding cards from either of said card-supplying devices to said discharge mechanism, and means controlled by the punchings in the successive cards from the first card-supplying device for selectively determining whether said feeding device shall act on the cards from the first or the second card-supplying device.

12. In combination, discharge mechanism, a card-supplying device for supplying punched cards, a card-supplying device for supplying stop cards, a feeding device for feeding cards from either of said card-supplying devices to said discharge mechanism, and means controlled by the punchings in the successive cards from the first card-supplying device for selectively determining whether said feeding means shall feed such controlling card from the first card-supplying device to the discharge mechanism or shall first feed a card from the second card-supplying device to the discharge mechanism.

13. In combination, discharge mechanism, a card-supplying device for supplying punched cards, a card-supplying device for supplying stop cards, a feeding device for feeding cards from either of said card-supplying devices to said discharge mechanism, said feeding device normally acting to feed punched cards successively from the first card-supplying device, and means controlled by the punchings in the successive punched cards from the first card-supplying device for interrupting the normal action of said feeding means and causing the feeding means to feed a stop card from the second card-supplying device to the discharge mechanism ahead of the controlling card which produces such action when the controlling punchings in said controlling card differ from those in the preceding card from the first card-supplying device.

14. In combination, a discharge mechanism which discharges successively in a pile cards fed to it, feeding mechanism for feeding cards to said discharge mechanism from either of two piles, and means controlled by each successive card from one pile for selectively determining whether the feeding mechanism shall feed such card or a card from the other pile to the discharge mechanism.

15. In combination, a discharge mechanism which discharges successively in a pile cards fed to it, feeding mechanism for feeding cards to said discharge mechanism from either of two piles, and means coöperating with each successive card from one pile and controlled by controlling punchings therein for causing said feeding mechanism in its next operation to feed such card to the discharge mechanism when such controlling punchings are the same as in the preceding card from such pile and for feeding a card from the other pile to the discharge mechanism when such controlling punchings are different from those in the preceding card from the first pile.

16. In combination, a discharge mechanism which discharges successively in a pile cards fed to it, feeding mechanism for feeding cards to said discharge mechanism from either of two piles, said feeding mechanism normally operating to feed cards from one of said piles successively to said discharge mechanism, and means controlled by controlling punchings in each successive card fed from said pile for intermitting the feeding of such card and causing the feeding mechanism to feed a card from the other pile to the discharge mechanism when such controlling punchings differ from those in the preceding card from the first pile.

17. In combination, discharge mechanism, two card-supplying devices, a feeding device for feeding cards from either of said card-supplying devices to said discharge mechanism, a control member on to which said feeding device feeds the successive cards from one of said card-supplying devices on their way to the discharge mechanism, circuit-closing means coöperating with said control member through punchings in each card fed thereon, and electric devices selectively controlled by the circuits closed by said circuit-closing means for controlling the action of said feeding device.

18. In combination, discharge mechanism, two card-supplying devices, a feeding device for feeding cards from either of said card-supplying devices to said discharge mechanism, a control member on to which said feeding device feeds the successive cards from one of said card-supplying devices on their way to the discharge mechanism, circuit-closing means coöperating with said control member through punchings in each card fed thereon, and electromagnetic devices selectively controlled by the circuits closed by said circuit-closing means and selectively determining whether the feeding device shall feed the card on the control member on to the discharge mechanism or shall intermit the feeding of such card and feed a card from the other card-supplying device to the discharge mechanism.

19. In combination, discharge mechanism, two card-supplying devices arranged on opposite sides of said discharge mechanism, a control member arranged between the first of said card-supplying devices and said discharge mechanism, a reciprocating feeding device for feeding cards successively from said first card-supplying device to the control member and from the control member to the discharge mechanism or from the second card-supplying device to the discharge mechanism, circuit-closing means coöperating through punchings in the cards with the successive cards fed to the control member, circuit-closing means operated co-cyclically with the feeding mechanism, and electromagnetic devices controlled jointly by said two circuit-closing means for selectively determining the action of the feeding mechanism in accordance with the punchings of the cards fed to the control plate.

20. In combination, a control member, a feeding device for feeding cards to and from such control member, and means controlled by each card fed to the control member for determining whether such card shall be fed from the control member immediately or subsequently.

21. In combination, discharge mechanism, a control member, a feeding device for feeding cards from the control member to the discharge mechanism, and means coöperating with each card supplied to the control member for determining whether such card shall be fed to the discharge mechanism immediately or subsequently.

22. In combination, a card-feeding device for feeding cards from either of two piles and means coöperating successively with the cards from one of said piles for selectively determining whether said feeding device shall act on cards from one or the other of said piles.

23. In combination, a card-feeding device for feeding cards from either of two piles, means coöperating successively with cards from one of said piles and controlled by punchings in said cards for selectively closing electrical contact devices, and electromagnetic devices controlled by the closing of said electrical contact devices for selectively determining whether said feeding device shall act on cards from one or the other of said two piles.

24. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, and switching mechanism operable by any one of said magnets and when so operated opening the circuits for said magnets save the one which produces such operation.

25. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a resetting magnet for moving said switching mechanism to a position to render possible the closing of the circuit of any of said magnets by said contact mechanism, and means for causing the energization of said resetting magnet when any operation of said contact mechanism fails to close the circuit of the electro-magnet for which the circuit was closed during the preceding operation of said contact mechanism.

26. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a resetting magnet for moving said switching mechanism to a position to render possible the closing of the circuit of any of said magnets by said contact mechanism.

27. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for said magnets save the one which produces such operation, and card-feeding mechanism selectively controlled by the movement of said switching mechanism.

28. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a resetting magnet for moving said switching mechanism to a position to render possible the closing of the circuit of any of said magnets by said contact mechanism, means for causing the energization of said resetting magnet when any operation of said contact mechanism fails to close the circuit of the electro-magnet for which the circuit was closed during the preceding operation of said contact mechanism, and card-feeding mechanism selectively controlled by the movement of said switching mechanism.

29. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, and card-feeding mechanism selectively controlled by the movement of said switching mechanism.

30. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, and a controlling circuit which requires for its closing that said switching mechanism be in a definite position.

31. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, and a controlling circuit which requires for its closing that said switching mechanism be in a definite position.

32. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a resetting magnet for moving said switching mechanism to a position to render possible the closing of the circuit of any of said magnets by said contact mechanism, and a controlling circuit which requires for its closing that said switching mechanism be in a definite position.

33. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a controlling circuit which requires for its closing that said switching mechanism be in a definite position, and card-feeding mechanism controlled by said controlling circuit.

34. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a controlling circuit which requires for its closing that said switching mechanism be in a definite position, and card-feeding mechanism controlled by said controlling circuit.

35. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a resetting magnet for moving said switching mechanism to a position to render possible the closing of the circuit of any of said magnets by said contact mechanism, and a controlling circuit which requires for its closing that said switching mechanism be in a definite position, and card-feeding mechanism controlled by said controlling circuit.

36. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a controlling circuit which requires for its closing that said switching mechanism be in a definite position, card-feeding mechanism operating on the cards from the aforesaid series of cards or on cards from another series of cards, and means for selectively controlling the action of said card-feeding mechanism on cards from said two series of cards by the opening or closing of said controlling circuit.

37. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a controlling circuit which requires for its closing that said switching mechanism be in a definite position, card-feeding mechanism operating on the cards from the aforesaid series of cards or on cards from another series of cards, and means for selectively controlling the action of said card-feeding mechanism on cards from said two series of cards by the opening or closing of said controlling circuit.

38. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a resetting magnet for moving said switching mechanism to a position to render possible the closing of the circuit of any of said magnets by said contact mechanism, a controlling circuit which requires for its closing that said switching mechanism be in a definite position, card-feeding mechanism operating on the cards from the aforesaid series of cards or on cards from another series of cards, and means for selectively controlling the action of said card-feeding mechanism on cards from said two series of cards by the opening or closing of said controlling circuit.

39. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, and switching mechanism for each group of magnets, each switching mechanism being operable by any magnet in its group and when so operated opening the circuit for all the magnets in said group save the one which produces such operation.

40. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, and switching mechanism for each group of magnets, each switching mechanism being operable by any magnet in its group and when so operated opening the circuit for all the magnets in said group save the one which produces such operation, and a resetting magnet for each group for moving the switching mechanism of such group to closed position to render possible the closing of the circuit of any of the magnets in that group by said contact mechanism, and means for causing the energization of the resetting magnet for any group when any operation of said contact mechanism fails to close the circuit of that electro-magnet of such group for which the circuit was closed during the preceding operation of said contact mechanism.

41. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, and a resetting magnet for each group for moving the switching mechanism of such group to closed position to render possible the closing of the circuit of any of the magnets in that group by said contact mechanism.

42. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, and card-feeding mechanism selectively controlled by the movement of said switching mechanisms.

43. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switch mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said contact mechanism, and card-feeding mechanism selectively controlled by the movements of said switching mechanisms.

44. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, and card-feeding mechanism selectively controlled by the movements of said switching mechanisms.

45. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, and a series circuit passing through all said switching mechanisms and requiring for its closing that each of said switching mechanisms be in a definite position.

46. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said contact mechanism, and a series circuit passing through all said switching mechanisms and requiring for its closing that each of said switching mechanisms be in a definite position.

47. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, and a series circuit passing through all said switching mechanisms and requiring for its closing that each of said switching mechanisms be in a definite position.

48. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a series circuit passing through all said switching mechanism and requiring for its closing that each of said switching mechanisms be in a definite position, and card-feeding mechanism controlled by said series circuit.

49. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said contact mechanism, a series circuit passing through all said switching mechanism and requiring for its closing that each of said switching mechanisms be in a definite position, and a card-feeding mechanism controlled by said series circuit.

50. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in its corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, a series circuit passing through all said switching mechanisms and requiring for its closing that each of said switching mechanisms be in a definite position, and card-feeding mechanism controlled by said series circuit.

51. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a series circuit passing through all said switching mechanisms and requiring for its closing that each of said switching mechanisms be in a definite position, card-feeding mechanism operating on the cards from the aforesaid series of cards or on cards from another series of cards, and means for selectively controlling the action of said card-feeding mechanism on cards from said two series of cards by the opening or closing of said series circuit.

52. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said contact mechanism, a series circuit passing through all said switching mechanisms and requiring for its closing that each of said switching mechanisms be in a definite position, card-feeding mechanism operating on the cards from the aforesaid series of cards or on cards from another series of cards, and means for selectively controlling the action of said card-feeding mechanism on cards from said two series of cards by the opening or closing of said series circuit.

53. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, a series circuit passing through all said switching mechanisms and requiring for its closing that each of said switching mechanisms be in a definite position, card-feeding mechanism operating on the cards from the aforesaid series of cards or on cards from another series of cards, and means for selectively controlling the action of said card-feeding mechanism on cards from said two series of cards by the opening or closing of said series circuit.

54. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a commutator operated synchronously with said contact mechanism and card-feeding mechanism controlled jointly by said commutator and said switching mechanism.

55. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, means for causing the energization of said resetting magnet when any operation of said contact mechanism fails to close the circuit of the electro-magnet for which the circuit was closed during the preceding operation of said contact mechanism, a commutator operated synchronously with said contact mechanism, and card-feeding mechanism controlled jointly by said commutator and said switching mechanism.

56. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuit for all said magnets save the one which produces such operation, a resetting magnet for moving said switching mechanism to a position to render possible the closing of the circuit of any of said magnets by said contact mechanism, a commutator operated synchronously with said contact mechanism, and card-feeding mechanism controlled jointly by said commutator and said switching mechanism.

57. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a commutator operated synchronously with said contact mechanism, and card-feeding mechanism controlled jointly by said commutator and said switching mechanisms.

58. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said contact mechanism, a commutator operated synchronously with said contact mechanism, and card-feeding mechanism controlled jointly by said commutator and said switching mechanisms.

59. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, a commutator operated synchronously with said contact mechanism, and card-feeding mechanism controlled jointly by said commutator and said switching mechanisms.

60. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a commutator operated synchronously with said contact mechanism, and a controlling circuit which requires for its closing that said switch mechanism be in a definite position, said controlling circuit also passing through said commutator.

61. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, means for causing the energization of said resetting magnet when any operation of said contact mechanism fails to close the circuit of the electro-magnet for which the circuit was closed during the preceding operation of said contact mechanism, a commutator operated synchronously with said contact mechanism, and a controlling circuit which requires for its closing that said switch mechanism be in a definite position, said controlling circuit also passing through said commutator.

62. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, a commutator operated synchronously with said contact mechanism, and a controlling circuit which requires for its closing that said switch mechanism be in a definite position, said controlling circuit also passing through said commutator.

63. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a commutator operated synchronously with said contact mechanism, and a series circuit which requires for its closing that all said switch mechanisms be in a definite position, said series circuit also passing through said commutator.

64. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magents in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said mechanism, a commutator operated synchronously with said contact mechanisms, and a series circuit which requires for its closing that all said switch mechanisms be in a definite position, said series circuit also passing through said commutator.

65. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, a commutator operated synchronously with said contact mechanism, and a series circuit which requires for its closing that all said switch mechanisms be in a definite position, said series circuit also passing through said commutator.

66. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a commutator operated synchronously with said contact mechanism, a controlling circuit which requires for its closing that said switch mechanism be in a definite position, said controlling circuit also passing through said commutator, and card-feeding mechanism controlled by said controlling circuit.

67. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, means for causing the energization of said resetting magnet when any operation of said contact mechanism fails to close the circuit of the electro-magnet for which the circuit was closed during the preceding operation of said contact mechanism, and a controlling circuit which requires for its closing that said switch mechanism be in a definite position, said controlling circuit also passing through said commutator, and card-feeding mechanism controlled by said controlling circuit.

68. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, a commutator operated synchronously with said contact mechanism, a controlling circuit which requires for its closing that said switch mechanism be in a definite position, said controlling circuit also passing through said commutator, and card-feeding mechanism controlled by said controlling circuit.

69. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a commutator operated synchronously with said contact mechanism, a series circuit which requires for its closing that all said switch mechanisms be in a definite position, said series circuit also passing through said commutator, and card-feeding mechanism controlled by said series circuit.

70. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said mechanism, a commutator operated synchronously with said contact mechanism, a series circuit which requires for its closing that all said switch mechanisms be in a definite position, said series circuit also passing through said commutator, and card-feeding mechanism controlled by said series circuit.

71. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, a commutator operated synchronously with said contact mechanism, a series circuit which requires for its closing that all said switch mechanisms be in a definite position, said series circuit also passing through said commutator, and card-feeding mechanism controlled by said series circuit.

72. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a commutator operated synchronously with said contact mechanism, a controlling circuit which requires for its closing that said switch mechanism be in a definite position, said controlling circuit also passing through said commutator, card-feeding mechanism operating on the cards from the aforesaid series of cards or on cards from another series of cards, and means for selectively controlling the action of said card-feeding mechanism on cards from said two series of cards by the opening or closing of said controlling circuit.

73. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, means for causing the energization of said resetting magnet when any operation of said contact mechanism fails to close the circuit of the electro-magnet for which the circuit was closed during the preceding operation of said contact mechanism, a commutator operated synchronously with said contact mechanism, a controlling circuit which requires for its closing that said switch mechanism be in a definite position, said controlling circuit also passing through said commutator, card-feeding mechanism operating on the cards from the aforesaid series of cards or on cards from another series of cards, and means for selectively controlling the action of said card-feeding mechanism on cards from said two series of cards by the opening or closing of said controlling circuit.

74. In combination, electrical contact mechanism coöperating successively with cards from a series of cards and controlled by punchings in such cards, said contact mechanism having a plurality of associated contacts, a group of electro-magnets, one electro-magnet for each of said associated contacts, connections from such contacts to the corresponding magnets, switching mechanism operable by any one of said magnets and when so operated opening the circuits for all said magnets save the one which produces such operation, a resetting magnet for moving said switching mechanism to a position to render possible the closing of the circuit of any of said magnets by said contact mechanism, a commutator operated synchronously with said contact mechanism, a controlling circuit which requires for its closing that said switch mechanism be in a definite position, said controlling circuit also passing through said commutator, card-feeding mechanism operating on the cards from the aforesaid series of cards or on cards from another series of cards, and means for selectively controlling the action of said card-feeding mechanism on cards from said two series of cards by the opening or closing of said controlling circuit.

75. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a commutator operated synchronously with said contact mechanism, a series circuit which requires for its closing that all said switch mechanisms be in a definite position, said series circuit also passing through said commutator, card-feeding mechanism operating on the cards from the aforesaid series of cards or on cards from another series of cards, and means for selectively controlling the action of said card-feeding mechanism on cards from said two series of cards by the opening or closing of said series circuit.

76. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, means for causing the energization of the resetting magnet for any group when any operation of said contact mechanism fails to close the circuit of that electro-magnet of such group for which the circuit was closed during the preceding operation of said mechanism, a commutator operated synchronously with said contact mechanism, a series circuit which requires for its closing that all said switch mechanisms be in a definite position, said series circuit also passing through said commutator, card-feeding mechanism operating on the cards from the aforesaid series of cards or on cards from another series of cards, and means for selectively controlling the action of said card-feeding mechanism on cards from said two series of cards by the opening or closing of said series circuit.

77. In combination, electrical contact mechanism coöperating successively with cards from a series of cards and controlled by punchings in such cards, said contact mechanism having a plurality of groups of associated contacts, a group of electro-magnets for each of said groups of contacts, there being one electro-magnet in each group for each contact in the corresponding group of contacts, connections from such contacts to the corresponding magnets, switching mechanism for each group of magnets, each switching mechanism being operable by any magnet in its group and when so operated opening the circuit for all the magnets in said group save the one which produces such operation, a resetting magnet for each group for moving the switching mechanism of such group to closed position to render possible the closing of the circuit of any of the magnets in that group by said contact mechanism, a commutator operated synchronously with said contact mechanism, a series circuit which requires for its closing that all said switch mechanisms be in a definite position, said series circuit also passing through said commutator, card-feeding mechanism operating on the cards from the aforesaid series of cards or on cards from another series of cards, and means for selectively controlling the action of said card-feeding mechanism on cards from said two series of cards by the opening or closing of said series circuit.

78. In combination, a series of electro-magnets, a movable armature for each magnet, the several armatures being independently movable, a movable switch bar, mechanical connections between said armatures and said switch bar whereby the movement of any armature by its magnet moves said switch bar to one position, a resetting magnet for moving said switch bar to the other position and thereby drawing the aforesaid armature away from its magnet, and a switch finger carried by each armature and connected in the circuit of its associated magnet and coöperating with said switch bar, said fingers all engaging said switch bar when the latter is in the position to which it is moved by said resetting magnet, and all said fingers save the one carried by the armature which produces the movement being disengaged from the switch bar by the movement of the latter when any of said armatures is moved by its magnet.

79. In combination, a row of magnets, a corresponding row of armatures, one for each magnet, said armatures being coaxially pivoted and independently movable, a switch bar pivoted co-axially with said armatures, mechanical connections between each armature and the switch bar whereby the movement of the armature by its magnet moves the switch bar to one position and the movement of the switch bar to its other position moves any armature which has been attracted by its associated magnet away from such magnet, a resetting magnet for moving said switch bar to said last-named position, and a contact finger carried by each armature and coöperating with said switch bar, said switch bar engaging all said fingers when in said last-named position and being disengaged from all said fingers save the one which is carried by the armature which produces the movement when in the first-named position.

80. In combination, a row of magnets, a corresponding row of armatures, one for each magnet, said armatures being co-axially pivoted and independently movable, a switch bar pivoted co-axially with said armatures, mechanical connections between each armature and the switch bar whereby the movement of the armature by its magnet moves the switch bar to one position and the movement of the switch bar to its other position moves any armature which has been attracted by its associated magnet away from such magnet, a resetting magnet for moving said switch bar to said last-named position, and a contact finger carried by each armature and coöperating with said switch bar, said switch bar engaging all said fingers when in said last-named position and being disengaged from all said fingers save the one which is carried by the armature which produces the movement when in the first-named position, each of said fingers being connected in circuit to the magnet associated with the armature which carries such finger.

81. In combination, a card-feeding device for feeding cards from either of two piles and depositing said cards successively in a third pile, and means coöperating successively with the cards from one of said piles for selectively determining whether said feeding device shall act on cards from one or the other of said piles.

82. In combination, a device which acts successively on cards which are taken from either of two piles, and means coöperating successively with the cards from one of said piles for selectively determining whether said device shall act on cards from one or the other of said piles.

83. In combination, a card-feeding device for feeding cards successively from a pile, and means coöperating successively with the cards from said pile for selectively determining whether said card-feeding device shall continue or intermit its feeding action of cards from such pile.

84. In combination, a card-feeding device for feeding cards successively from a pile, and means coöperating successively with the cards in said pile and controlled by punchings in said cards for causing said card-feeding device to intermit its feeding action when a card having different controlling punchings from the preceding card is reached.

85. In combination, discharge mechanism, a card-supplying device for feeding cards to said discharge mechanism, and means coöperating successively with the cards supplied from said card-supplying device to said discharge mechanism and controlled by punchings in said cards for intermitting the supply of cards from said card-supplying device to said discharge mechanism when a card is reached having different controlling punchings from those in the preceding card.

86. In combination, a discharge mechanism, a card-supplying device for supplying cards to said discharge mechanism, a feeding device for feeding cards successively from said card-supplying device to said discharge mechanism, and means coöperating with the successive cards from said card-supplying device for controlling said feeding device.

87. In combination, discharge mechanism, a card-supplying device for feeding cards to said discharge mechanism, a control member upon which the cards from said card-supplying device are fed successively before reaching the discharge mechanism, and means controlled by each card when fed to the control member for determining whether such card shall be fed on to the discharge mechanism or shall temporarily remain on the control member.

88. In combination, a control member, a feeding device for feeding cards successively from a pile to the control member and then off the control member, and means controlled by the action of the cards which pass on to the control member for selectively determining whether the feeding device shall continue or intermit its aforesaid feeding action.

89. In combination, discharge mechanism, a card-supplying device, a feeding device for feeding cards from said card-supplying device to said discharge mechanism, and means coöperating successively with the cards from said card-supplying device for causing an intermitting of the action of the feeding device on the cards from said card-supplying device when a card is reached which differs in any controlling respect from the preceding card.

In witness whereof, I, CHARLES A. TRIPP, have hereunto set my hand at Indianapolis, Indiana, this 23rd day of June, A. D. one thousand nine hundred and fifteen.

CHARLES A. TRIPP.